US009858506B2

(12) United States Patent
Isupov et al.

(10) Patent No.: US 9,858,506 B2
(45) Date of Patent: Jan. 2, 2018

(54) METHODS AND SYSTEMS FOR PROCESSING OF IMAGES OF MATHEMATICAL EXPRESSIONS

(71) Applicant: ABBYY Development LLC, Moscow (RU)

(72) Inventors: Dmitry Isupov, Moscow Region (RU); Anton Masalovitch, Moscow (RU)

(73) Assignee: ABBYY DEVELOPMENT LLC, Moscow (RU)

( * ) Notice: Subject to any disclaimer, the term of this patent is extended or adjusted under 35 U.S.C. 154(b) by 298 days.

(21) Appl. No.: 14/679,219

(22) Filed: Apr. 6, 2015

(65) Prior Publication Data

US 2016/0063323 A1   Mar. 3, 2016

(30) Foreign Application Priority Data

Sep. 2, 2014 (RU) ................. 2014135842

(51) Int. Cl.
  *G06K 9/72* (2006.01)
  *G06K 9/00* (2006.01)
(52) U.S. Cl.
  CPC ......... *G06K 9/726* (2013.01); *G06K 9/00476* (2013.01); *G06K 2209/01* (2013.01)
(58) Field of Classification Search
  CPC .... G06T 11/60; G06K 9/00476; G06K 9/726; G06K 2209/01
  USPC ................. 382/200, 203, 204, 310
  See application file for complete search history.

(56) References Cited

U.S. PATENT DOCUMENTS

| 4,706,212 A | 11/1987 | Toma |
| 5,068,789 A | 11/1991 | Van Vliembergen |
| 5,128,865 A | 7/1992 | Sadler |
| 5,146,405 A | 9/1992 | Church |

(Continued)

FOREIGN PATENT DOCUMENTS

| JP | 2003256769 A | 9/2003 |
| JP | 2003256770 A | 9/2003 |
| RU | 2421810 | 6/2011 |

OTHER PUBLICATIONS

Okamoto, et al. (An Experimental Implementation of a Document Recognition System for Papers Containing Mathematical Expressions), Springer-Verlag Berlin Heidelberg, pp. 37-53, 1992.*

(Continued)

*Primary Examiner* — Daniel Mariam
(74) *Attorney, Agent, or Firm* — Lowenstein Sandler LLP

(57) ABSTRACT

The current document is directed to methods and systems that convert document images containing mathematical expression into corresponding electronic documents. In one implementation, an image or sub-image containing a mathematical expression is recursively partitioned into blocks separated by white-space stripes. Horizontal and vertical partitioning are alternately and recursively applied to the image or sub-image containing a mathematical expression until the lowest-level blocks obtained by partitioning correspond to symbols recognizable by character-recognition methods. Graph-based analysis of the recognized symbols provides a basis for encoding an equivalent representation of the mathematical expression contained in the image or sub-image.

19 Claims, 34 Drawing Sheets

(56) References Cited

U.S. PATENT DOCUMENTS

| | | |
|---|---|---|
| 5,175,684 A | 12/1992 | Chong |
| 5,268,839 A | 12/1993 | Kaji |
| 5,301,109 A | 4/1994 | Landauer et al. |
| 5,386,556 A | 1/1995 | Hedin et al. |
| 5,418,717 A | 5/1995 | Su et al. |
| 5,426,583 A | 6/1995 | Uribe-Echebarria Diaz de Mendibi |
| 5,475,587 A | 12/1995 | Anick et al. |
| 5,477,451 A | 12/1995 | Brown et al. |
| 5,490,061 A | 2/1996 | Tolin et al. |
| 5,497,319 A | 3/1996 | Chong et al. |
| 5,510,981 A | 4/1996 | Berger et al. |
| 5,550,934 A | 8/1996 | Van Vliembergen et al. |
| 5,559,693 A | 9/1996 | Anick et al. |
| 5,677,835 A | 10/1997 | Carbonnell et al. |
| 5,678,051 A | 10/1997 | Aoyama |
| 5,687,383 A | 11/1997 | Nakayama et al. |
| 5,696,980 A | 12/1997 | Brew |
| 5,715,468 A | 2/1998 | Budzinski |
| 5,721,938 A | 2/1998 | Stuckey |
| 5,724,593 A | 3/1998 | Hargrave et al. |
| 5,737,617 A | 4/1998 | Bernth et al. |
| 5,752,051 A | 5/1998 | Cohen |
| 5,768,603 A | 6/1998 | Brown et al. |
| 5,784,489 A | 7/1998 | Van Vliembergen et al. |
| 5,787,410 A | 7/1998 | McMahon |
| 5,794,050 A | 8/1998 | Dahlgren et al. |
| 5,794,177 A | 8/1998 | Carus et al. |
| 5,826,219 A | 10/1998 | Kutsumi |
| 5,826,220 A | 10/1998 | Takeda et al. |
| 5,848,385 A | 12/1998 | Poznanski et al. |
| 5,873,056 A | 2/1999 | Liddy et al. |
| 5,884,247 A | 3/1999 | Christy |
| 6,006,221 A | 12/1999 | Liddy et al. |
| 6,055,528 A | 4/2000 | Evans |
| 6,076,051 A | 6/2000 | Messerly et al. |
| 6,081,774 A | 6/2000 | De Hita et al. |
| 6,161,083 A | 12/2000 | Franz et al. |
| 6,182,028 B1 | 1/2001 | Karaali et al. |
| 6,223,150 B1 | 4/2001 | Duan et al. |
| 6,233,544 B1 | 5/2001 | Alshawi |
| 6,233,546 B1 | 5/2001 | Datig |
| 6,243,669 B1 | 6/2001 | Horiguchi |
| 6,243,670 B1 | 6/2001 | Bessho et al. |
| 6,243,689 B1 | 6/2001 | Norton |
| 6,260,008 B1 | 7/2001 | Sanfilippo |
| 6,266,642 B1 | 7/2001 | Franz et al. |
| 6,275,789 B1 | 8/2001 | Moser et al. |
| 6,278,967 B1 | 8/2001 | Akers et al. |
| 6,282,507 B1 | 8/2001 | Horiguchi et al. |
| 6,285,978 B1 | 9/2001 | Bernth et al. |
| 6,330,530 B1 | 12/2001 | Horiguchi et al. |
| 6,356,864 B1 | 3/2002 | Foltz et al. |
| 6,356,865 B1 | 3/2002 | Franz et al. |
| 6,381,598 B1 | 4/2002 | Williamowski et al. |
| 6,393,389 B1 | 5/2002 | Chanod et al. |
| 6,463,404 B1 | 10/2002 | Appleby |
| 6,470,306 B1 | 10/2002 | Pringle et al. |
| 6,601,026 B2 | 7/2003 | Appelt et al. |
| 6,604,101 B1 | 8/2003 | Chan et al. |
| 6,622,123 B1 | 9/2003 | Chanod et al. |
| 6,658,627 B1 | 12/2003 | Gallup et al. |
| 6,721,697 B1 | 4/2004 | Duan et al. |
| 6,760,695 B1 | 7/2004 | Kuno et al. |
| 6,778,949 B2 | 8/2004 | Duan et al. |
| 6,871,174 B1 | 3/2005 | Dolan et al. |
| 6,871,199 B1 | 3/2005 | Binnig et al. |
| 6,901,399 B1 | 5/2005 | Corston et al. |
| 6,901,402 B1 | 5/2005 | Corston-Oliver et al. |
| 6,928,448 B1 | 8/2005 | Franz et al. |
| 6,937,974 B1 | 8/2005 | D'Agostini |
| 6,947,923 B2 | 9/2005 | Cha et al. |
| 6,965,857 B1 | 11/2005 | Decary |
| 6,983,240 B2 | 1/2006 | Ait-Mokhtar et al. |
| 6,986,104 B2 | 1/2006 | Green et al. |
| 7,013,264 B2 | 3/2006 | Dolan et al. |
| 7,020,601 B1 | 3/2006 | Hummel et al. |
| 7,027,974 B1 | 4/2006 | Busch et al. |
| 7,050,964 B2 | 5/2006 | Menzes et al. |
| 7,085,708 B2 | 8/2006 | Manson et al. |
| 7,146,358 B1 | 12/2006 | Gravano et al. |
| 7,167,824 B2 | 1/2007 | Kallulli |
| 7,181,068 B2 | 2/2007 | Yokota et al. |
| 7,191,115 B2 | 3/2007 | Moore |
| 7,200,550 B2 | 4/2007 | Menezes et al. |
| 7,263,488 B2 | 8/2007 | Chu et al. |
| 7,269,594 B2 | 9/2007 | Corston-Oliver et al. |
| 7,346,493 B2 | 3/2008 | Ringger et al. |
| 7,356,457 B2 | 4/2008 | Pinkham et al. |
| 7,475,015 B2 | 1/2009 | Epstein et al. |
| 7,561,737 B2 | 7/2009 | Zou et al. |
| 7,561,739 B2 | 7/2009 | Xu et al. |
| 7,739,102 B2 | 6/2010 | Bender |
| 7,885,456 B2 | 2/2011 | Shi et al. |
| 7,929,767 B2 | 4/2011 | Hou et al. |
| 8,009,915 B2 | 8/2011 | Vukosavljevic et al. |
| 8,078,450 B2 | 12/2011 | Anisimovich et al. |
| 8,145,473 B2 | 3/2012 | Anisimovich et al. |
| 8,214,199 B2 | 7/2012 | Anismovich et al. |
| 8,300,949 B2 | 10/2012 | Xu |
| 8,830,241 B1* | 9/2014 | Gorner .................... G06K 9/34 345/467 |
| 8,856,096 B2 | 10/2014 | Marchisio et al. |
| 2001/0014902 A1 | 8/2001 | Hu et al. |
| 2001/0029442 A1 | 10/2001 | Shiotsu et al. |
| 2001/0029455 A1 | 10/2001 | Chin et al. |
| 2002/0040292 A1 | 4/2002 | Marcu |
| 2003/0158723 A1 | 8/2003 | Masuichi et al. |
| 2003/0176999 A1 | 9/2003 | Calcagno et al. |
| 2003/0182102 A1 | 9/2003 | Corston-Oliver et al. |
| 2003/0204392 A1 | 10/2003 | Finnigan et al. |
| 2004/0034520 A1 | 2/2004 | Langkilde-Geary et al. |
| 2004/0098247 A1 | 5/2004 | Moore |
| 2004/0122656 A1 | 6/2004 | Abir |
| 2004/0172235 A1 | 9/2004 | Pinkham et al. |
| 2004/0193401 A1 | 9/2004 | Ringger et al. |
| 2004/0254781 A1 | 12/2004 | Appleby |
| 2005/0010421 A1 | 1/2005 | Watanabe et al. |
| 2005/0015240 A1 | 1/2005 | Appleby |
| 2005/0080613 A1 | 4/2005 | Colledge et al. |
| 2005/0086047 A1 | 4/2005 | Uchimoto et al. |
| 2005/0137853 A1 | 6/2005 | Appleby et al. |
| 2005/0155017 A1 | 7/2005 | Berstis et al. |
| 2005/0171757 A1 | 8/2005 | Appleby |
| 2005/0209844 A1 | 9/2005 | Wu et al. |
| 2006/0004563 A1 | 1/2006 | Campbell et al. |
| 2006/0004653 A1 | 1/2006 | Strongin |
| 2006/0080079 A1 | 4/2006 | Yamabana |
| 2006/0095250 A1 | 5/2006 | Chen et al. |
| 2006/0217964 A1 | 9/2006 | Kamatani et al. |
| 2006/0224378 A1 | 10/2006 | Chino et al. |
| 2006/0293876 A1 | 12/2006 | Kamatani et al. |
| 2007/0003147 A1 | 1/2007 | Viola et al. |
| 2007/0010990 A1 | 1/2007 | Woo |
| 2007/0016398 A1 | 1/2007 | Buchholz |
| 2007/0083359 A1 | 4/2007 | Bender |
| 2007/0100601 A1 | 5/2007 | Kimura |
| 2014/0115447 A1* | 4/2014 | Elseth .................... G06F 17/10 715/249 |

OTHER PUBLICATIONS

Bolshakov, "Co-Ordinative Ellipsis in Russian Texts: Problems of Description and Restoration", Published in: Proceeding COLING '88 Proceedings of the 12th conference on Computational linguistics—vol. 1 doi>10.3115/991635.991649, 1988, 65-67.

Hutchins, "Machine Translation: past, present, future", (Ellis Horwood Series in Computers and their Applications) Ellis Horwood: Chichester, 1986, 382 pp. ISBN 0-85312-788-3, $49.95 (hb).

(56) References Cited

OTHER PUBLICATIONS

Mitamura, et al., "An Efficient Interlingua Translation System for Multi-Lingual Document Production", http://citeseerx.ist.psu.edu/viewdoc/summary?doi=10.1.1.44.5702, Jul. 1, 1991.

* cited by examiner

<My goal was supposed to be a math teacher, however, I ended up to be hired by a personal computer company.>

Taking programing classes in my college and purchasing a microcomputer seemed to be a trigger for working with a computer. One day, when I got news that a new, high performance computer had been on r sale, I chose the computer company as a part time job. The job was to answer to customer's questions in the show room, and I was allowed to use those computers anytime when I had nothing to do.

"You soon get tired of one thing. I wonder how you can keep taking care of high school students by three years as a teacher", one day an executive of the company said, which made me sense certainly. Then, I made a decision to get a job in the company.it was a small venture business where I was working for. While working there being given a lot of different roles at the developmental fields, every day was absolutely fulfillment for me. The company was happened to be sold by TOSHIBA, Inc., when it was my tenth year. If you work for a corporation, your goal should be getting a position as "president". However, TOSHIBA had more than thirty executives; many of them were so smart people, it was totally impossible for me to be the president.

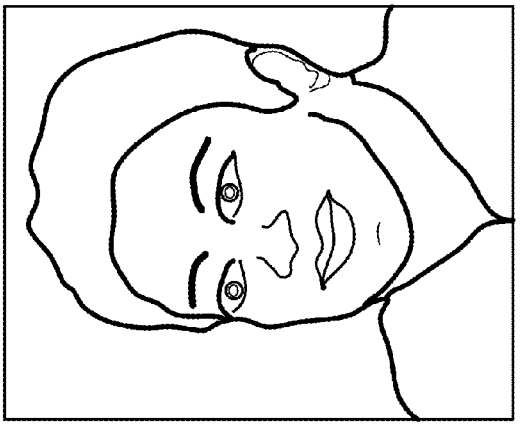

Fall Down Seven Times, Get up Eight

Handmade Search Engine by Grope

Born in Tokyo in 1957. Graduate from Tokyo University of Science in 1979, got employed by Sword Machine Systems. Moving to Soft Bank Laboratory, Soft Bank, then funded Yahoo Inc, in January 1996. President & CEO Yahoo Inc from January 1996. Jazz music and reading science fiction as hobby and interest. His current favorite is "Perry Rhodan Universe Hero", which has been written by multiple writers novel relay in Germany.

FIG. 1B

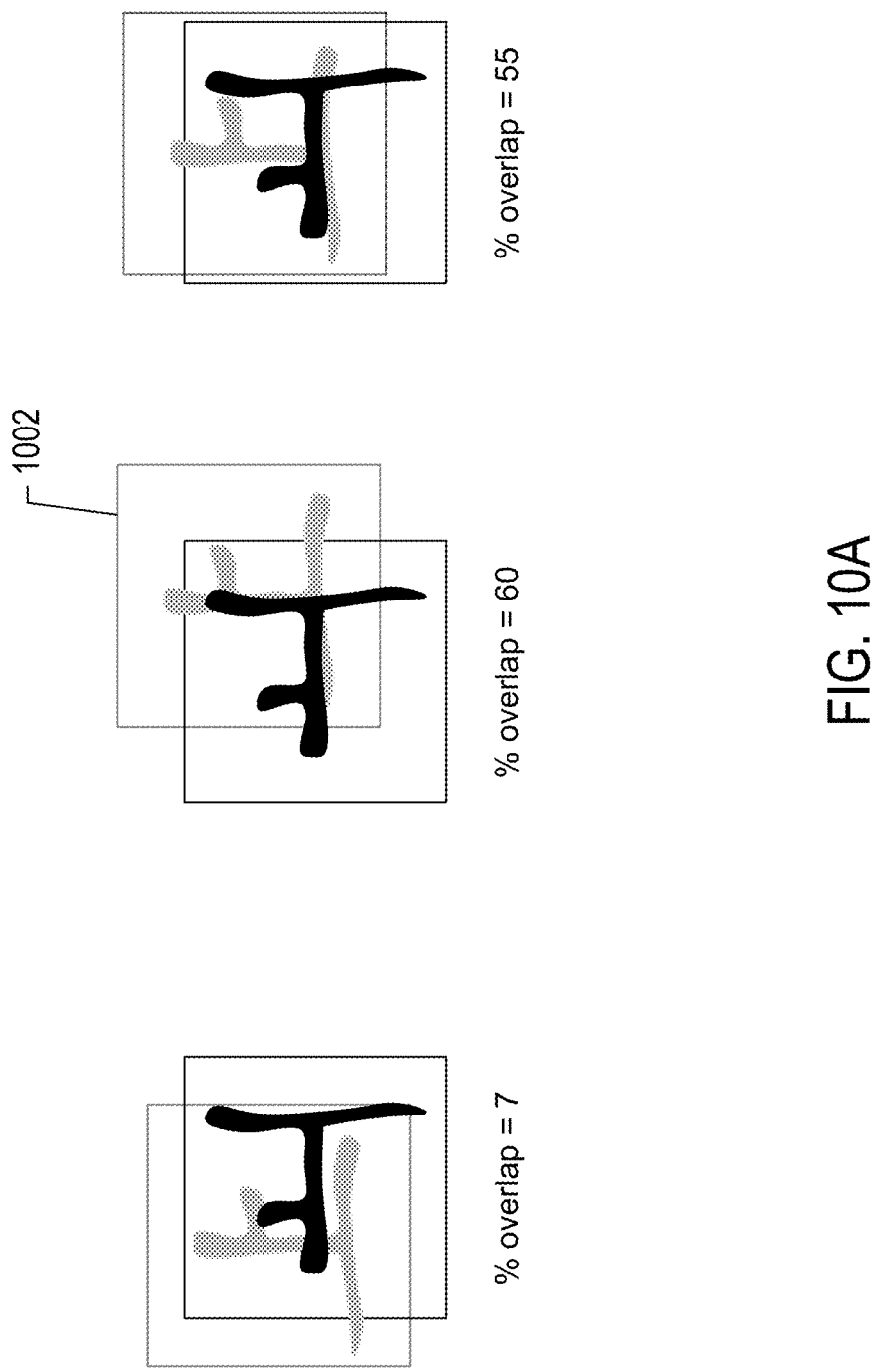

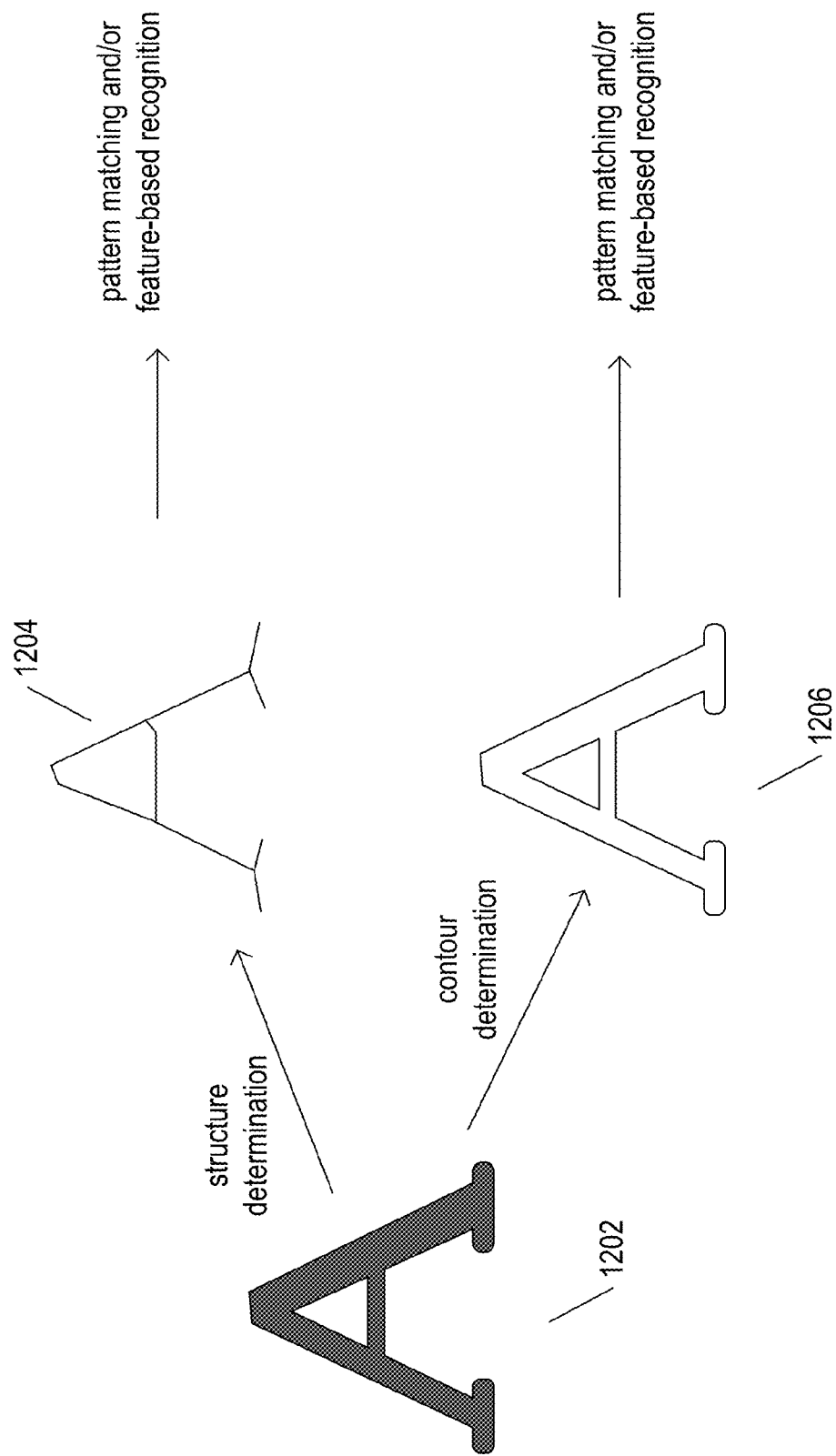

$$V = \frac{1}{4a} \iint_R r^2 dA = \frac{1}{4a} \int_0^\pi d\theta \int_0^{2a\sin\theta} r^3 dr \quad \text{—1402}$$

$$f_k(z) = (-1)^{k-1} \prod_{i \leq k} \langle i \rangle g(z)^{-\chi(k)} \Delta(z)^{-m(k)} E_{q^k-1}(z) \quad \text{—1404}$$

$$\bar{U} = \begin{bmatrix} \frac{1}{2x^1} & -\frac{x^2}{2(x^1)^2} \\ 0 & \frac{1}{x^1} \end{bmatrix} \begin{bmatrix} \frac{1}{2x^1} & 0 \\ \frac{x^2}{2(x^1)^2} & x^1 \end{bmatrix} \begin{bmatrix} 0 & \frac{1}{x^1} \\ -\frac{x^2}{2(x^1)^2} & x^2 \end{bmatrix} = \begin{bmatrix} \frac{x^1 x^2 + (x^2)^2}{4(x^1)^3} & -\frac{x^2}{2(x^1)^2} \\ -\frac{x^2}{2(x^1)^2} & \frac{1}{x^1} \end{bmatrix} \quad \text{—1406}$$

$$P(p) = \frac{r}{m^2} \left| \sum_{q=0}^{m/r-1} e^{\frac{2\pi i p q}{m/r}} \right|^2, \sum_{q=0}^{m/r-1} e^{\frac{2\pi i p q}{m/r}} = \begin{cases} \frac{m}{r}, & \text{if } p = 0 \text{ in } \mathbb{Z}_{m/r} \\ 0 & \text{otherwise} \end{cases} \quad \text{—1408}$$

$$Q_f |x\rangle |b\rangle |w\rangle = |x\rangle |b \oplus f(x)\rangle |w\rangle \quad \text{—1410}$$

FIG. 14A $$V = \frac{1}{4a} \iiint_R r^2 \, dA = \frac{1}{4a} \int_0^\pi d\theta \int_0^{2a\sin\theta} r^3 \, dr$$ — 1402

$$f_k(z) = (-1)^{k-1} \prod_{i \le k} \langle i \rangle g(z)^{-x(k)} \Delta(z)^{-m(k)} E_{q^k-1}(z)$$ — 1404

$$\bar{U} = \begin{bmatrix} \frac{1}{2x^1} & -\frac{x^2}{2(x^1)^2} & \frac{1}{x^1} \\ 0 & x^1 & 0 \\ -\frac{x^2}{2(x^1)^2} & \frac{x^1 x^2 + (x^2)^2}{4(x^1)^3} & \frac{1}{x^1} \\ \frac{1}{x^1} & -\frac{x^2}{2(x^1)^2} & \frac{1}{x^1} \end{bmatrix}$$ — 1406

$$P(p) = \frac{r}{m^2} \left| \sum_{q=0}^{m/r-1} e^{\frac{2\pi i p q}{m/r}} \right|^2 = \begin{cases} \frac{m}{r}, & \text{if } p = 0 \text{ in } \mathbb{Z}_{m/r} \\ 0 & \text{otherwise} \end{cases}$$ — 1408, 1410

$$Q_f(|x\rangle|b\rangle)|w\rangle = |x\rangle|b \oplus f(x)\rangle|w\rangle$$ — 1426, 1428

FIG. 14B

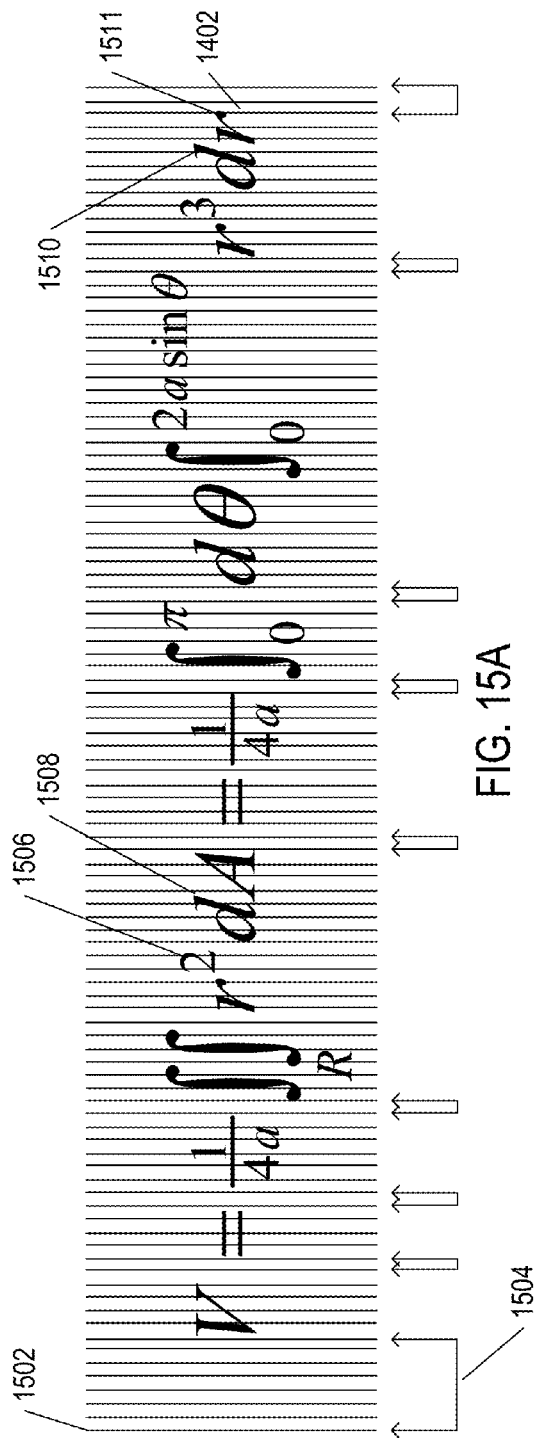
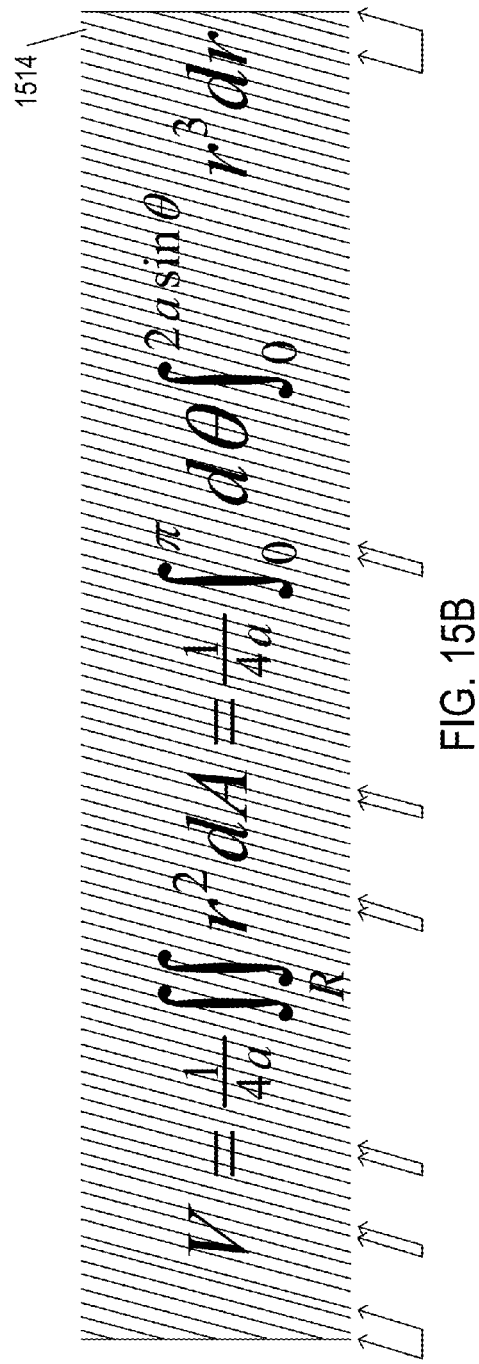
FIG. 15A
FIG. 15B $$V = \frac{1}{4a}\iint_R r^2\, dA = \frac{1}{4a}\int_0^\pi d\theta \int_0^{2a\sin\theta} r^3\, dr$$

FIG. 16A

METHODS AND SYSTEMS FOR PROCESSING OF IMAGES OF MATHEMATICAL EXPRESSIONS

CROSS REFERENCE TO RELATED APPLICATIONS

This application claims the benefit of priority to Russian Patent Application No. 2014135842, filed Sep. 2, 2014; disclosure of which is incorporated herein by reference in its entirety.

TECHNICAL FIELD

The current document is directed to automated processing of scanned-document images and other text-containing images and, in particular, to methods and systems that convert images and sub-images of documents containing mathematical expressions into electronic documents.

BACKGROUND

Printed, typewritten, and handwritten documents have long been used for recording and storing information. Despite current trends towards paperless offices, printed documents continue to be widely used in commercial, institutional, and home environments. With the development of modern computer systems, the creation, storage, retrieval, and transmission of electronic documents has evolved, in parallel with continued use of printed documents, into an extremely efficient and cost-effective alternative information-recording and information-storage medium. Because of overwhelming advantages in efficiency and cost effectiveness enjoyed by modern electronic-document-based information storage and information transactions, printed documents are routinely converted into electronic documents by various methods and systems, including conversion of printed documents into digital scanned-document images using electro-optico-mechanical scanning devices, digital cameras, and other devices and systems followed by automated processing of the scanned-document images to produce electronic documents encoded according to one or more of various different electronic-document-encoding standards. As one example, it is now possible to employ a desktop scanner and sophisticated optical-character-recognition ("OCR") programs running on a personal computer to convert a printed-paper document into a corresponding electronic document that can be displayed and edited using a word-processing program. Document images are also contained in web pages and various additional sources, and document images obtained from these sources are also converted to electronic documents using OCR methods.

While modern OCR programs have advanced to the point that complex document images that include pictures, frames, line boundaries, and other non-text elements as well as text symbols of any of many common alphabet-based languages can be automatically converted to electronic documents, challenges remain with respect to conversion of document images containing mathematical expressions.

SUMMARY

The current document is directed to methods and systems that convert document images containing mathematical expression into corresponding electronic documents. In one implementation, an image or sub-image containing a mathematical expression is recursively partitioned into blocks separated by white-space stripes. Horizontal and vertical partitioning are alternately and recursively applied to the image or sub-image containing a mathematical expression until the lowest-level blocks obtained by partitioning correspond to symbols recognizable by character-recognition methods. Graph-based analysis of the recognized symbols provides a basis for encoding an equivalent representation of the mathematical expression contained in the image or sub-image.

BRIEF DESCRIPTION OF THE DRAWINGS

FIG. 1B illustrates a printed document.

FIG. 10A illustrates a pattern-matching approach to symbol recognition by an OCR system.

FIG. 12 illustrates a number of additional types of symbol recognition that can be used to recognize symbols within images and sub-images of text documents.

FIG. 14A provides a number of examples of mathematical expressions as well as indications of features in the mathematical expressions that complicate and frustrate currently-used OCR methods applied to document sub-images that contain mathematical expressions.

FIG. 14B provides a number of examples of mathematical expressions as well as indications of features in the mathematical expressions that complicate and frustrate currently-used OCR methods applied to document sub-images that contain mathematical expressions.

FIG. 15A illustrates one implementation of a mathematical-expression-blocking method that partitions an image or sub-image containing a mathematical expression into lower-level blocks or partitions.

FIG. 15B illustrates one implementation of a mathematical-expression-blocking method that partitions an image or sub-image containing a mathematical expression into lower-level blocks or partitions.

FIG. 16A illustrates a recursive-blocking and graph-based approach to recognition of mathematical formulas during OCR processing of a document image.

DETAILED DESCRIPTION

The current document is directed to methods and systems that convert document images containing mathematical expressions to corresponding electronic documents. In the following discussion, scanned-document images, electronic documents, and currently available OCR methods and systems are discussed in a first subsection. A second subsection discusses challenges with respect to converting document images containing mathematical expressions. Finally, a detailed description of the methods and systems to which the current document is directed is provided in a third subsection.

Scanned Document Images and Electronic Documents

Figure 1A:
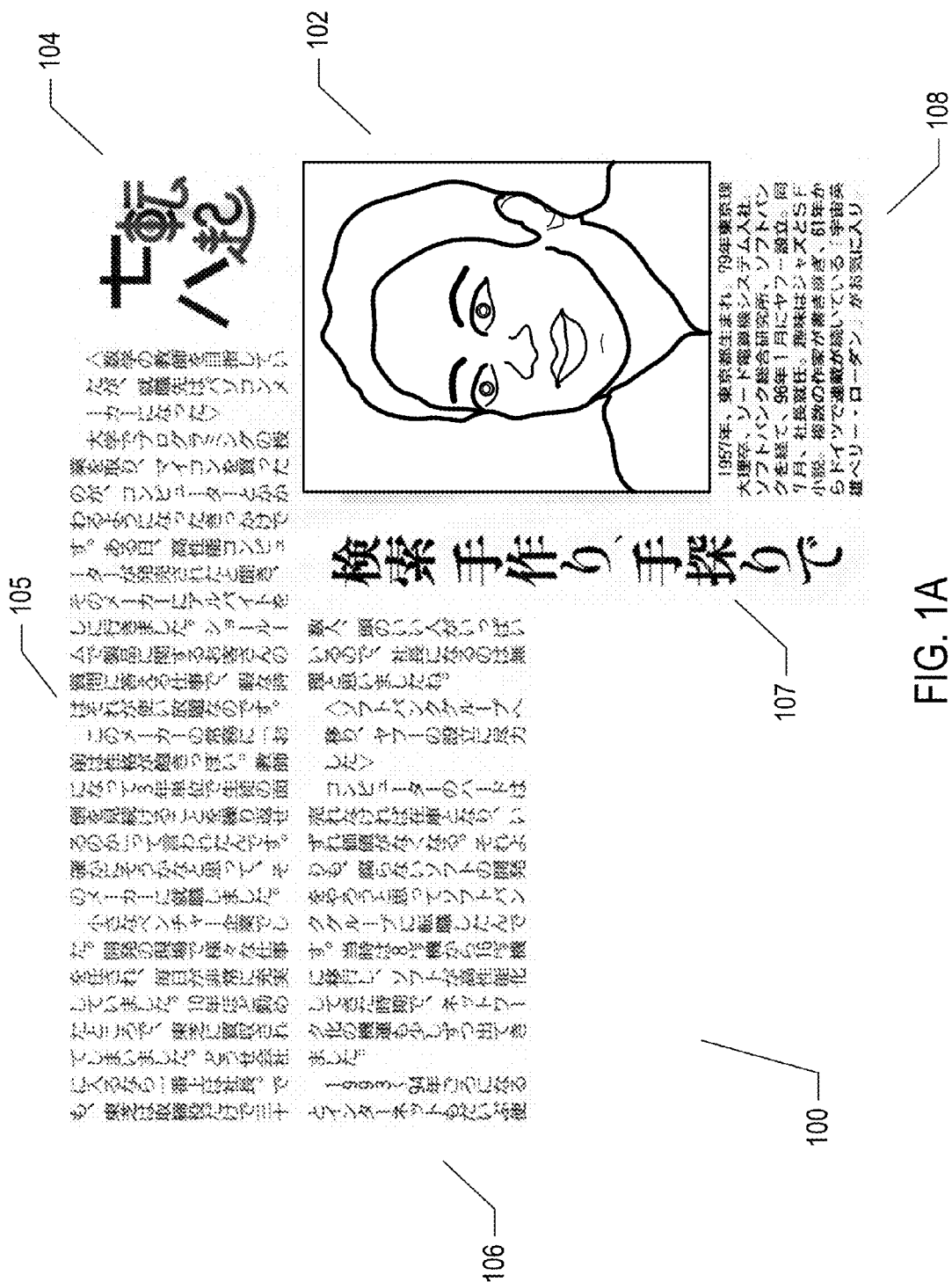
FIG. 1A illustrates a printed document.

FIGS. 1A-B illustrates a printed document. FIG. 1A shows the original document with Japanese text. The printed document 100 includes a photograph 102 and five different text-containing regions 104-108 that include Japanese characters. This is an example document used in the following discussion of the method and systems for sense-orientation determination to which the current document is directed. The Japanese text may be written in left-to-right fashion, along horizontal rows, as English is written, but may alternatively be written in top-down fashion within vertical columns. For example, region 107 is clearly written vertically while text block 108 includes text written in horizontal rows. FIG. 1B shows the printed document illustrated in FIG. 1A translated into English.

Figure 2:
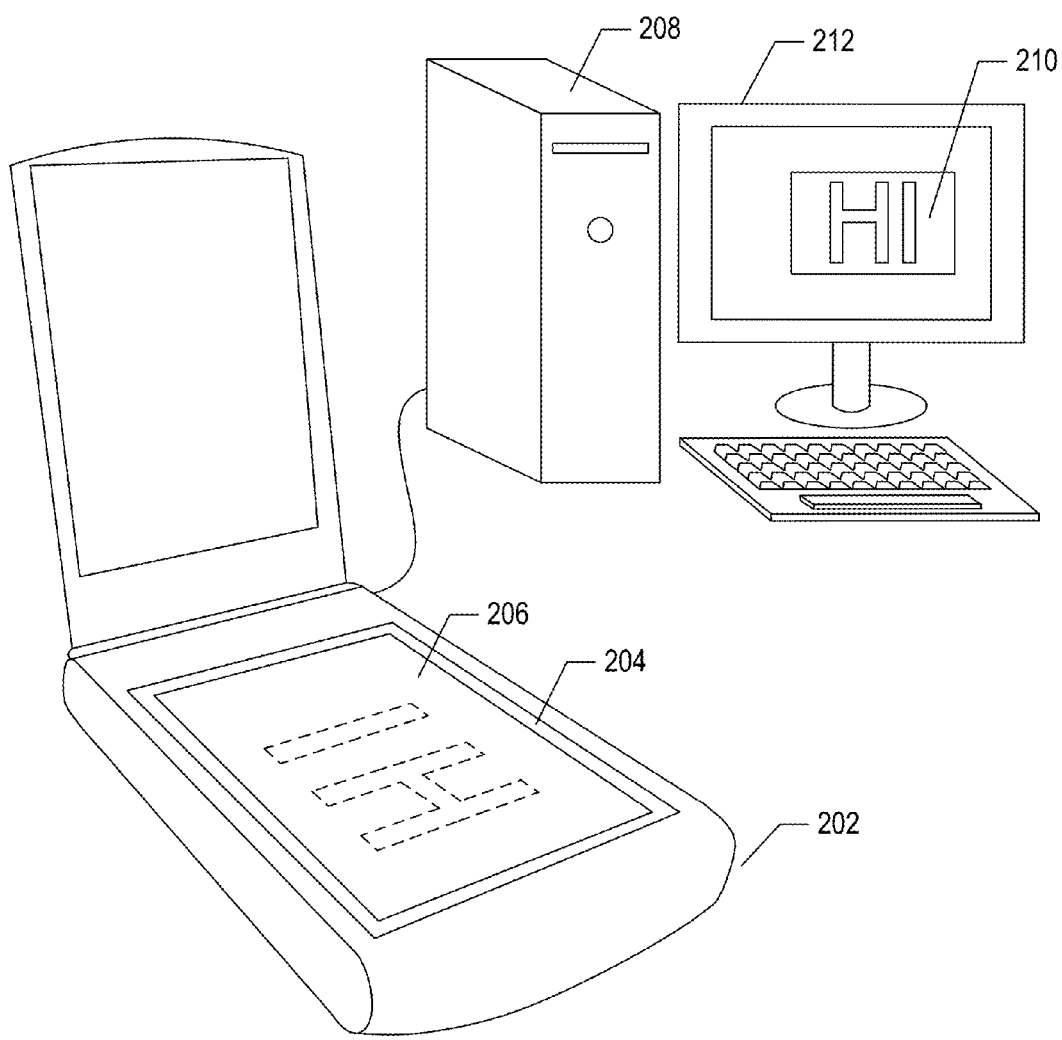
FIG. 2 illustrates a typical desktop scanner and personal computer that are together used to convert printed documents into digitally encoded electronic documents stored in mass-storage devices and/or electronic memories.

Printed documents can be converted into digitally encoded, scanned-document images by various means, including electro-optico-mechanical scanning devices and digital cameras. FIG. 2 illustrates a typical desktop scanner and personal computer that are together used to convert printed documents into digitally encoded electronic documents stored in mass-storage devices and/or electronic memories. The desktop scanning device 202 includes a transparent glass bed 204 onto which a document is placed, face down 206. Activation of the scanner produces a digitally encoded scanned-document image which may be transmitted to the personal computer ("PC") 208 for storage in a mass-storage device. A scanned-document-image-rendering program may render the digitally encoded scanned-document image for display 210 on a PC display device 212.

Figure 3:
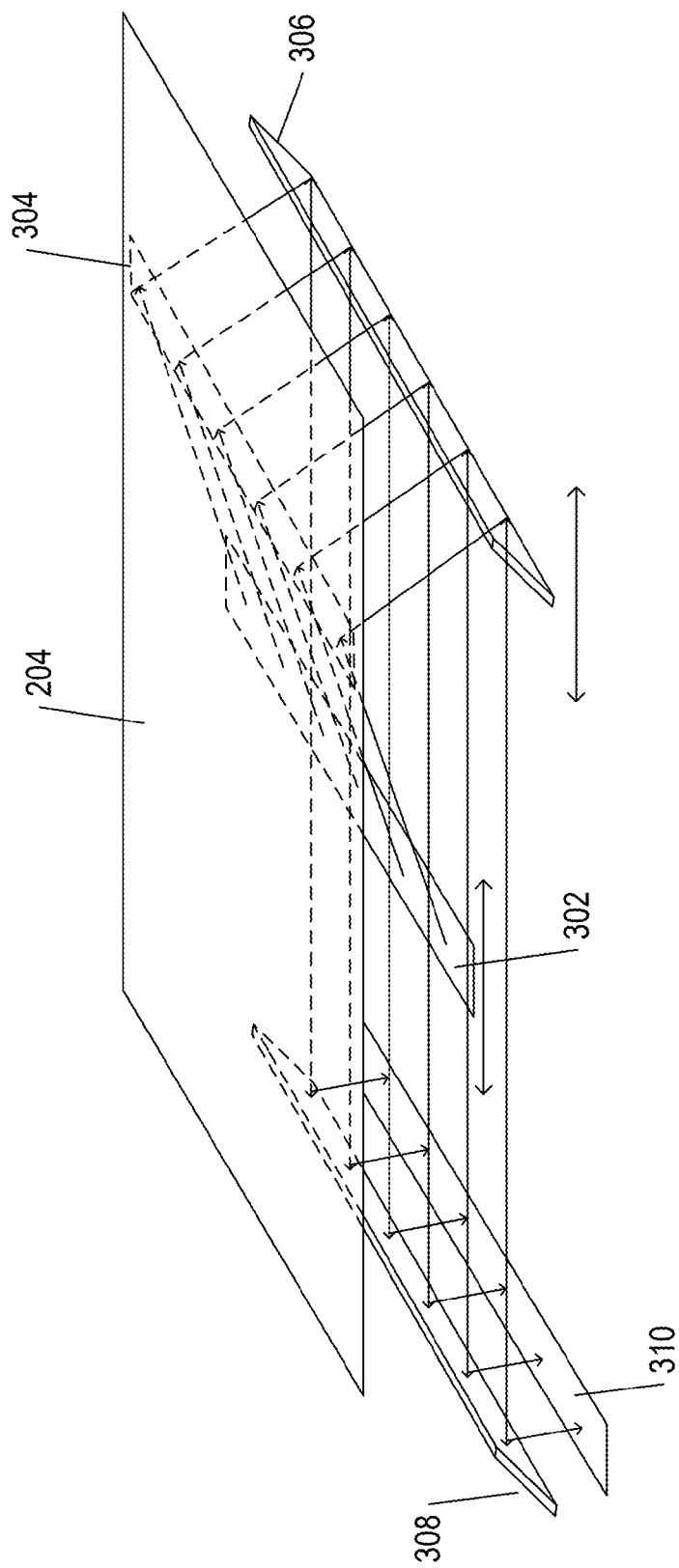
FIG. 3 illustrates operation of the optical components of the desktop scanner shown in FIG. 2.

FIG. 3 illustrates operation of the optical components of the desktop scanner shown in FIG. 2. The optical components in this charge-coupled-device ("CCD") scanner reside below the transparent glass bed 204. A laterally translatable bright-light source 302 illuminates a portion of the document being scanned 304 which, in turn, re-emits and reflects light downward. The re-emitted and reflected light is reflected by a laterally translatable mirror 306 to a stationary mirror 308, which reflects the emitted light onto an array of CCD elements 310 that generate electrical signals proportional to the intensity of the light falling on each of the CCD elements. Color scanners may include three separate rows or arrays of CCD elements with red, green, and blue filters. The laterally translatable bright-light source and laterally translatable mirror move together along a document to produce a scanned-document image. Another type of scanner is referred to as a "contact-image-sensor scanner" ("CIS scanner"). In a CIS scanner, moving colored light-emitting diodes ("LEDs") provide document illumination, with light reflected from the LEDs sensed by a photodiode array that moves together with the colored light-emitting diodes.

Figure 4:
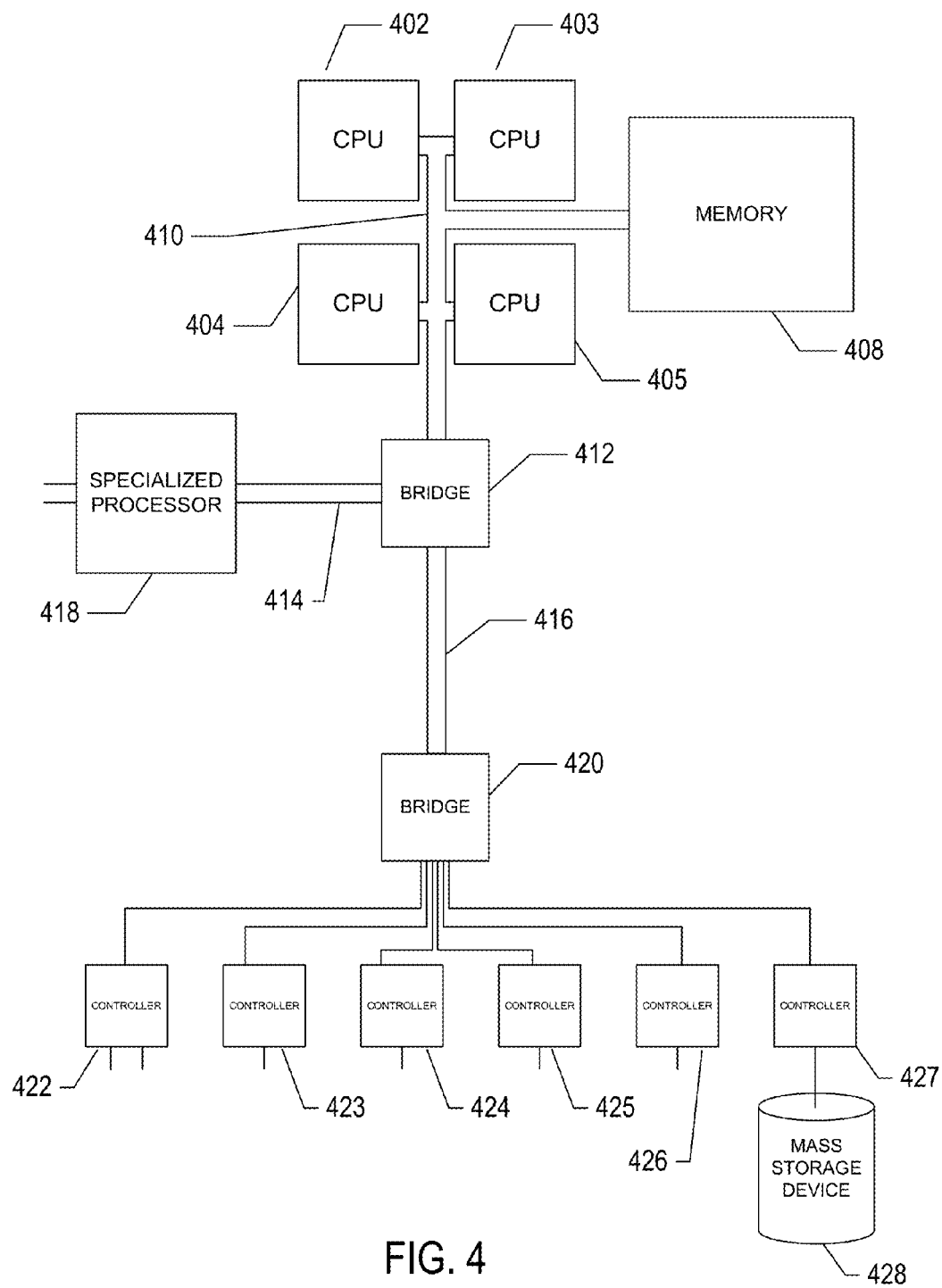
FIG. 4 provides a general architectural diagram for various types of computers and other processor-controlled devices.

FIG. 4 provides a general architectural diagram for various types of computers and other processor-controlled devices. The high-level architectural diagram may describe a modern computer system, such as the PC in FIG. 2, in which scanned-document-image-rendering programs and optical-character-recognition programs are stored in mass-storage devices for transfer to electronic memory and execution by one or more processors. The computer system contains one or multiple central processing units ("CPUs") 402-405, one or more electronic memories 408 interconnected with the CPUs by a CPU/memory-subsystem bus 410 or multiple busses, a first bridge 412 that interconnects the CPU/memory-subsystem bus 410 with additional busses 414 and 416, or other types of high-speed interconnection media, including multiple, high-speed serial interconnects. These busses or serial interconnections, in turn, connect the CPUs and memory with specialized processors, such as a graphics processor 418, and with one or more additional bridges 420, which are interconnected with high-speed serial links or with multiple controllers 422-427, such as controller 427, that provide access to various different types of mass-storage devices 428, electronic displays, input devices, and other such components, subcomponents, and computational resources.

Figure 5:
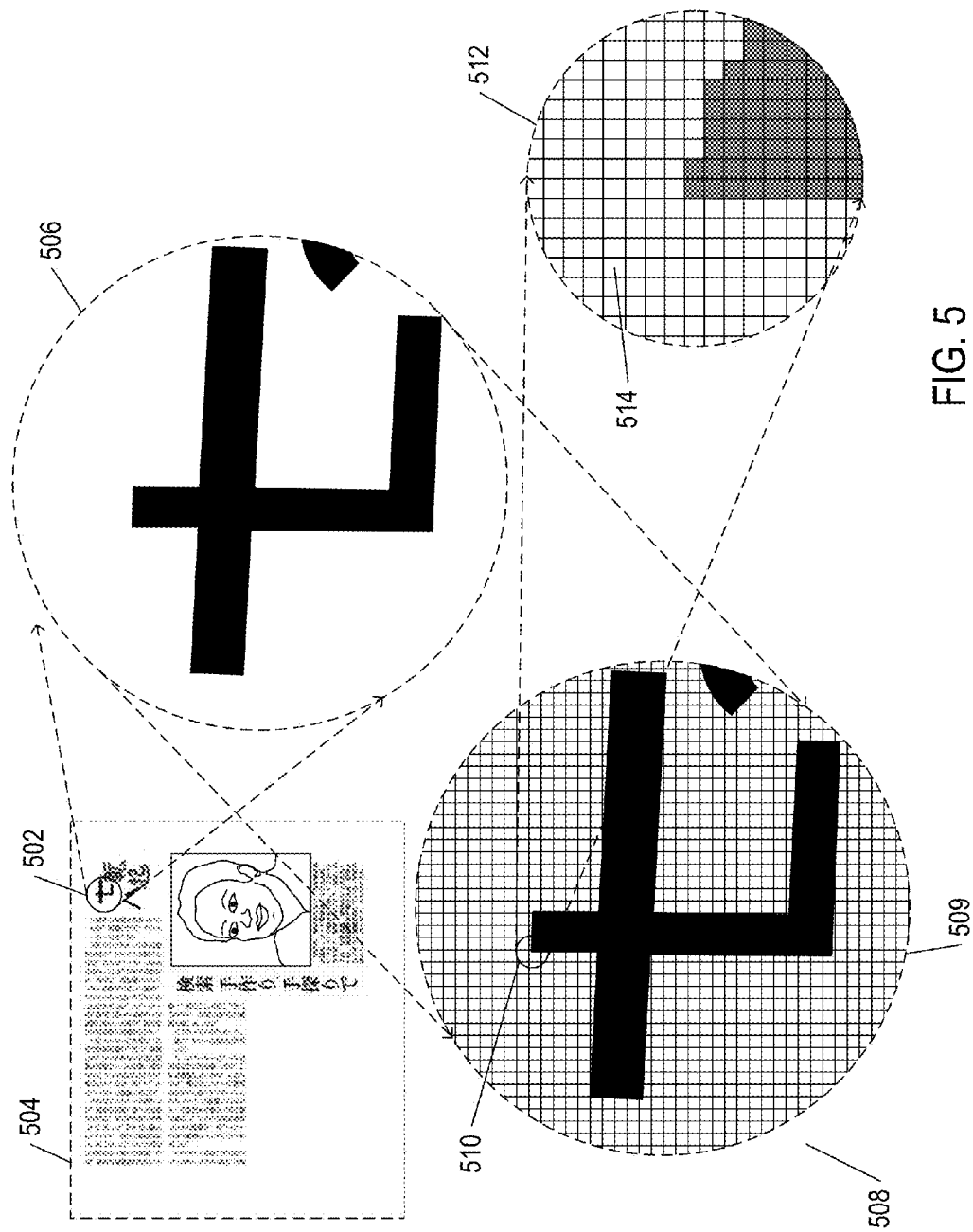
FIG. 5 illustrates digital representation of a scanned document.

FIG. 5 illustrates digital representation of a scanned document. In FIG. 5, a small disk-shaped portion 502 of the example printed document 504 is shown magnified 506. A corresponding portion of the digitally encoded scanned-document image 508 is also represented in FIG. 5. The digitally encoded scanned document includes data that represents a two-dimensional array of pixel-value encodings. In the representation 508, each cell of a grid below the characters, such as cell 509, represents a square matrix of pixels. A small portion 510 of the grid is shown at even higher magnification, 512 in FIG. 5, at which magnification the individual pixels are represented as matrix elements, such as matrix element 514. At this level of magnification, the edges of the characters appear jagged, since the pixel is the smallest granularity element that can be controlled to emit specified intensities of light. In a digitally encoded scanned-document file, each pixel is represented by a fixed number of bits, with the pixel encodings arranged sequentially. Header information included in the file indicates the type of pixel encoding, dimensions of the scanned image, and other information that allows a digitally encoded scanned-document-image rendering program to extract the pixel encodings and issue commands to a display device or printer to reproduce the pixel encodings in a two-dimensional representation of the original document. Scanned-document images digitally encoded in monochromatic grayscale commonly use 8-bit or 16-bit pixel encodings, while color scanned-document images may use 24 bits or more to encode each pixel according to various different color-encoding standards. As one example, the commonly used RGB standard employs three 8-bit values encoded within a 24-bit value to represent the intensity of red, green, and blue light. Thus, a digitally encoded scanned image generally represents a document in the same fashion that visual scenes are represented in digital photographs. Pixel encodings represent light intensity in particular, tiny regions of the image and, for colored images, additionally represent a color. There is no indication, in a digitally encoded scanned-document image, of the meaning of the pixels encodings, such as indications that a small two-dimensional area of contiguous pixels represents a text character.

By contrast, a typical electronic document produced by a word-processing program contains various types of line-drawing commands, references to image representations, such as digitally encoded photographs, and digitally encoded text characters. One commonly used encoding standard for text characters is the Unicode standard. The Unicode standard commonly uses 8-bit bytes for encoding American Standard Code for Information Exchange ("ASCII") characters and 16-bit words for encoding symbols and characters of many languages. A large part of the computational work carried out by an OCR program is to recognize images of text characters in a digitally encoded scanned-document image and convert the images of characters into corresponding Unicode encodings. Clearly, encoding text characters in Unicode takes far less storage space than storing pixilated images of text characters. Furthermore, Unicode-encoded text characters can be edited, reformatted into different fonts, and processed in many additional ways by word-processing programs while digitally encoded scanned-document images can only be modified through specialized image-editing programs.

In an initial phase of scanned-document-image-to-electronic-document conversion, a printed document, such as the example document 100 shown in FIG. 1, is analyzed to determine various different regions within the document. In many cases, the regions may be logically ordered as a hierarchical acyclic tree, with the root of the tree representing the document as a whole, intermediate nodes of the tree representing regions containing smaller regions, and leaf nodes representing the smallest identified regions. The regions can be identified using a variety of different techniques, including many different types of statistical analyses of the distributions of pixel encodings, or pixel values, over the area of the image. For example, in a color document, a photograph may exhibit a larger variation in color over the area of the photograph as well as higher-frequency variations in pixel-intensity values than regions containing text. The details of how a scanned-document image is analyzed in order to identify various different regions, such as those shown in FIG. 6, are beyond the scope of the current document.

Once an initial phase of analysis has determined the various different regions of a scanned-document image, those regions likely to contain text are further processed by OCR routines in order to identify text characters and convert the text characters into Unicode or some other character-encoding standard. In order for the OCR routines to process text-containing regions, an initial orientation of the text-containing region needs to be determined so that various pattern-matching methods can be efficiently employed by the OCR routines to identify text characters.

Generally, once a text-containing region is identified, the image of the text-containing region is converted from a pixel-based image to a bitmap, in a process referred to as "binarization," with each pixel represented by either the bit value "0," indicating that the pixel is not contained within a portion of a text character, or the bit value "1," indicating that the pixel is contained within a text character. Thus, for example, in a black-and-white-text-containing scanned-document-image region, where the text is printed in black on a white background, pixels with values less than a threshold value, corresponding to dark regions of the image, are translated into bits with value "1" while pixels with values equal to or greater than the threshold value, corresponding to background, are translated into bits with value "0." The bit-value convention is, of course, arbitrary, and an opposite convention can be employed, with the value "1" indicating background and the value "0" indicating character. The bitmap may be compressed, using run-length encoding, for more efficient storage.

Figure 6A:
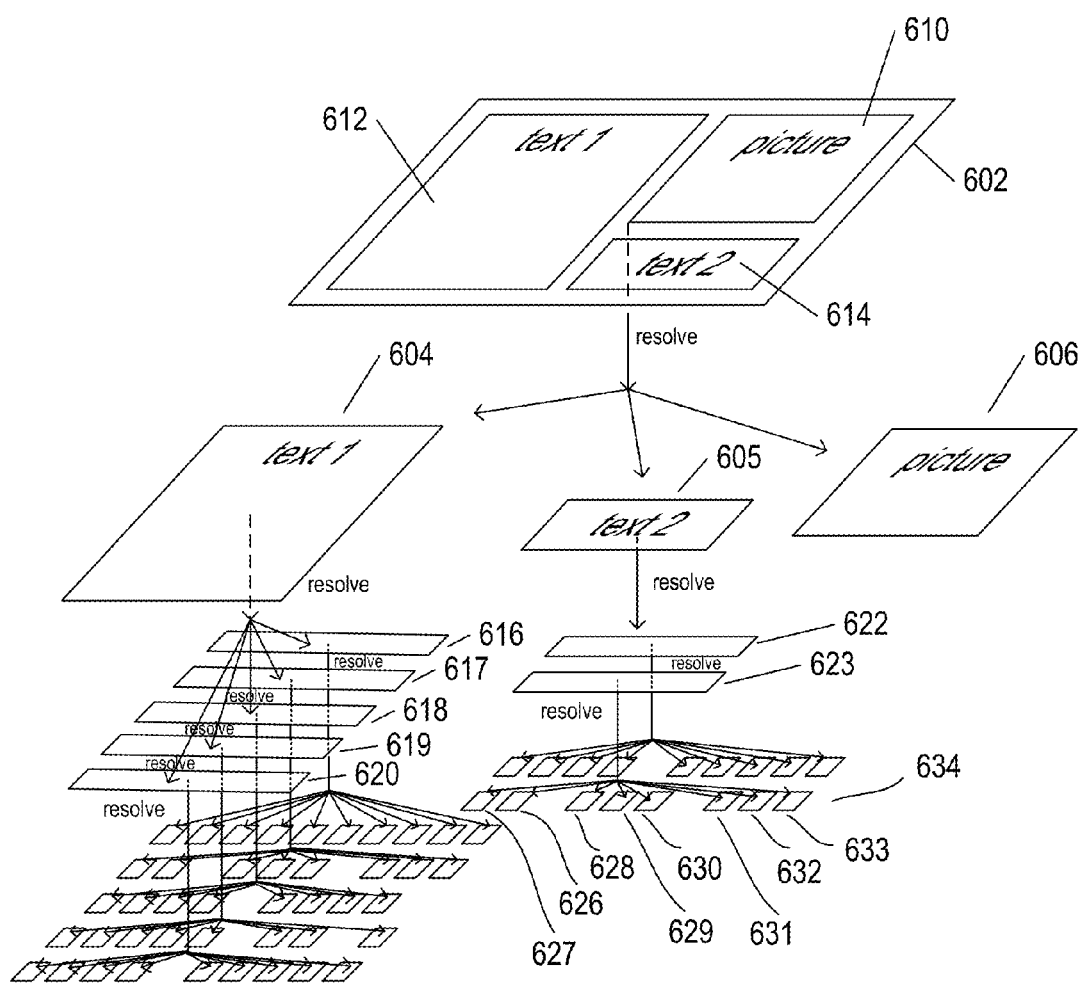
FIG. 6A illustrates one approach to conversion of a document image to an electronic document that is used in certain currently available OCR systems.
Figure 6B:
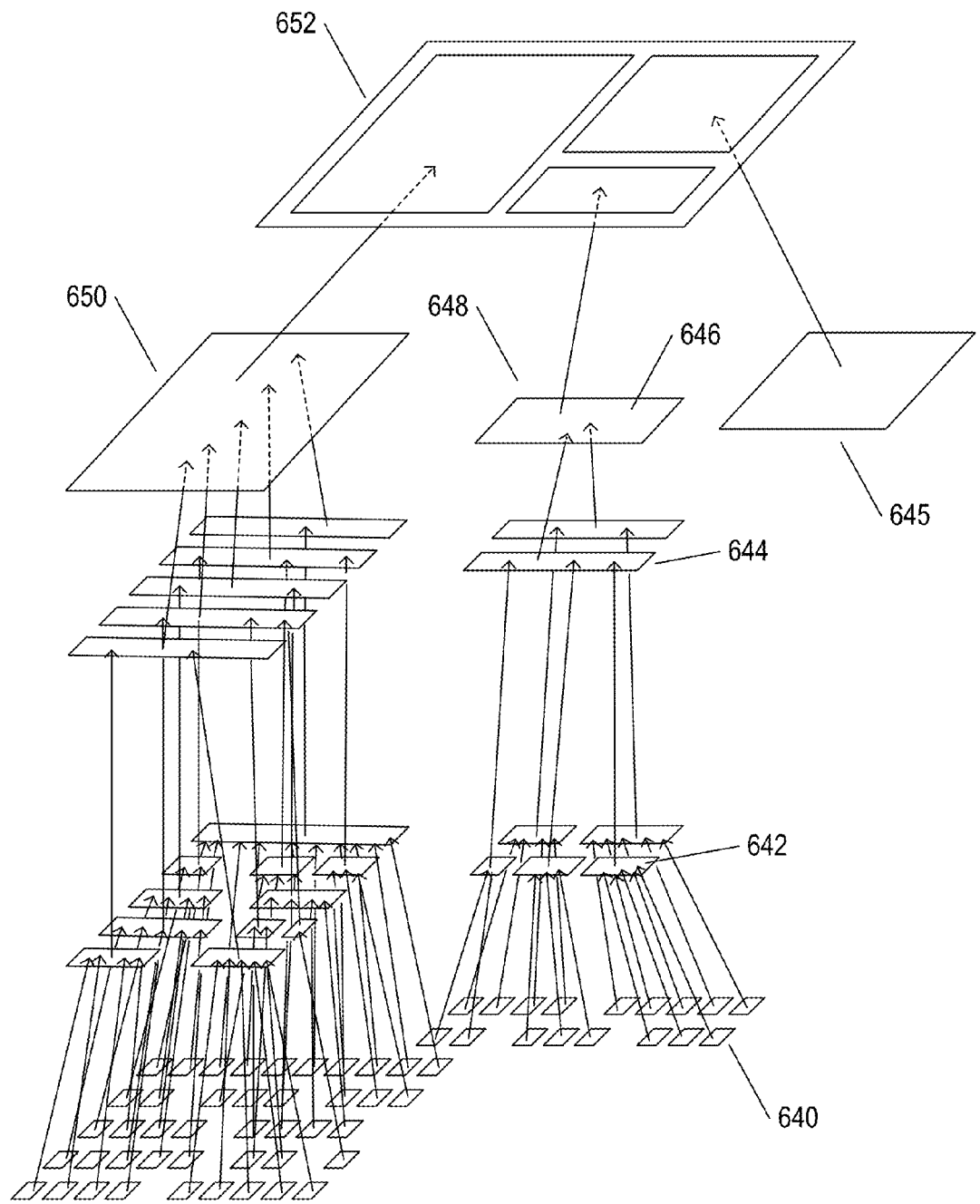
FIG. 6B illustrates one approach to conversion of a document image to an electronic document that is used in certain currently available OCR systems.
Figure 6C:
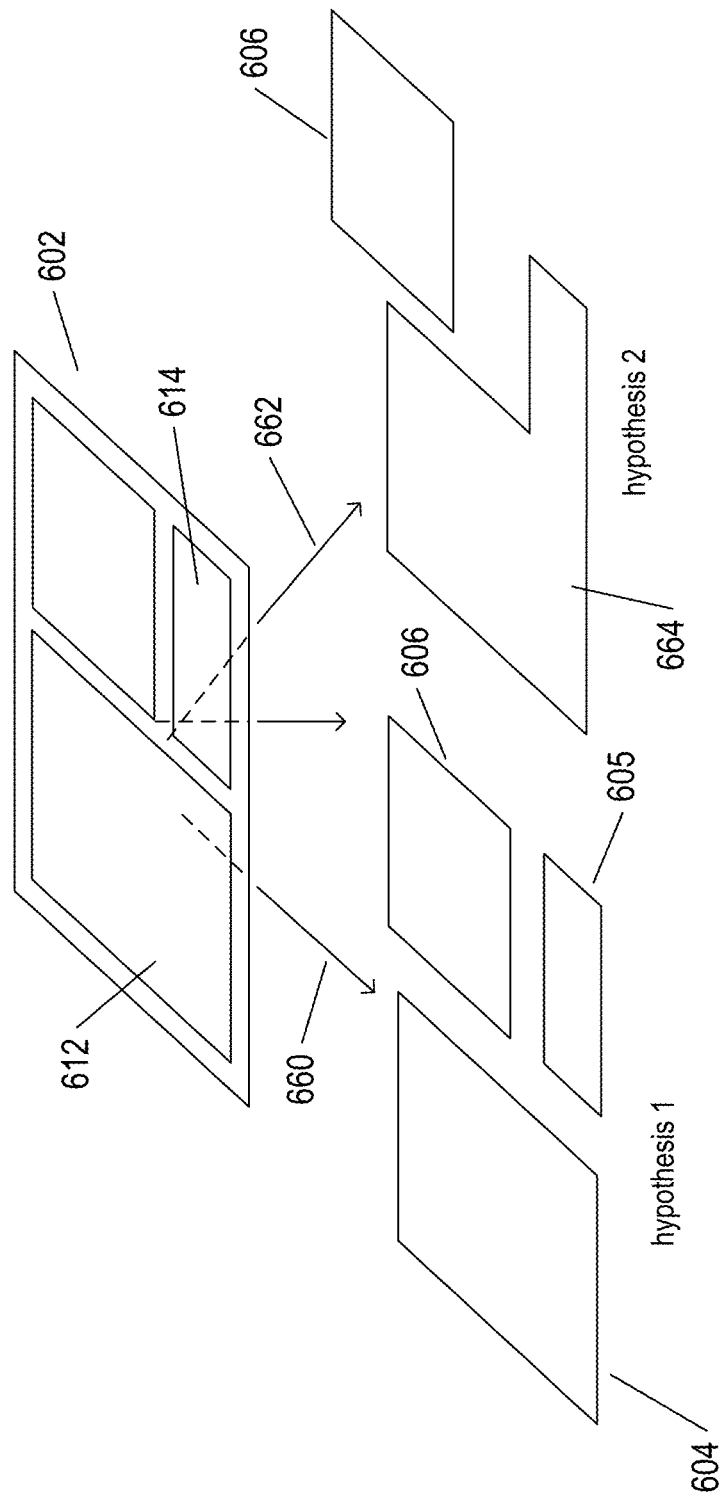
FIG. 6C illustrates one approach to conversion of a document image to an electronic document that is used in certain currently available OCR systems.

FIGS. 6A-C illustrate one approach to conversion of a document image to an electronic document that is used in certain currently available OCR systems. This approach is hierarchical in nature and can be understood and implemented recursively, although non-recursive or partially recursive orientations are also possible. Following initial orientation, a document image 602 is processed to resolve the document image into high-level document-image portions or elements 604-606. In the example shown in FIG.

6A, the document image includes a picture 610, a first text block 612, and a second text block 614. These are the high-level elements of the document image that are resolved into a corresponding first text-block image 604, a corresponding second text-block image 605, and a corresponding picture 606. In this case, the picture is a fundamental element of the document image and cannot be resolved further. However, in a second level of resolution, the first text-block image 604 is resolved into individual text-line images 616-620 and the second text-block image 605 is further resolved into text-line images 622-623. In a final level of resolution, each text-line image, such as text-line image 623, is further resolved into individual symbols, such as symbol images 626-634 corresponding to text-line image 623. In certain implementations, the resolution of text-line images into symbol images may involve at least partial initial resolution of text-line images into word images, for those languages in which alphabetic symbols are combined into words.

As illustrated in FIG. 6A, certain OCR methods and systems first resolve a document image 602 into symbol images, such as symbol images 626-634 before constructing an electronic document corresponding to the document image. In many of these systems, the symbol image is the finest granularity of resolution carried out by the OCR methods and systems with respect to text images.

Next, as shown in FIG. 6B, these OCR methods and systems generate an electronic document corresponding to the document image in a reverse hierarchical fashion. The symbol images, such as symbol image 640, are combined into words, such as word 642, for those languages in which alphabetic symbols are combined to form words. In a next level of electronic-document construction, the words are combined to produce text lines, such as text line 644 that contains word 642. In yet an additional level of electronic-document construction, the text lines are combined to produce text blocks, such as text block 646 that contains text line 644. Finally, all of the highest-element document elements, such as picture 606, text block 648, and text block 650 are combined together to produce an electronic document 652 corresponding to document image 602. The electronic document, as discussed above, generally contains Unicode representations of alphabetic symbols or characters and various types of control sequences to generate frames, borders, and other electronic-document features. Thus, alphabetic symbol 640 is generally a digitally encoded symbol, such as a Unicode character, that corresponds to the symbol image 633 in FIG. 6A. Similarly, picture 645 is generally a type of compressed image file corresponding to the picture 606 scanned as part of the document image. In other words, viewing the resolution of the document image into document-image elements as a tree, as shown in FIG. 6A, the leaf nodes of the tree are converted from scanned images into appropriate digital encodings that represent the information contained in the scanned images, and the digital encodings are then recombined, in the process shown in FIG. 6B, to produce a digitally encoded electronic document.

In FIGS. 6A-B, the resolution of a document image into elements and the construction of an electronic document from digital encodings of those elements are illustrated, for simplicity, using one-to-many mappings from higher-level elements to lower-level elements and from lower-level elements to higher-level elements. In both diagrams, all of the elements at a given level combine together to produce a single-higher level element at the next-highest level. However, in general, the OCR methods and systems encounter many different ambiguities and uncertainties during processing of document images, resulting in generation of multiple possible resolutions from a higher-level element to multiple sets of lower-level elements during the resolution phase and, during electronic-document-construction phase, a set of lower-level elements may be combined in different ways to lead to different higher-level elements.

FIG. 6C shows one example of the generation of multiple hypotheses during document-image resolution. In FIG. 6C, the initial document image 602 is, according to one hypothesis represented by arrow 660, resolved into the three lower-level components 604-606 discussed above with reference to FIG. 6A. However, according to a second hypothesis 662, the text image may be alternatively resolved into a single text block 664 and the picture 606. In this case, the border between the first text block 612 and the second text block 614 may be indistinct or entirely absent, in which case the OCR methods and systems may need to test the two alternative hypotheses. Generation of multi-way-hypothesis branching during both resolution and construction phases of the conversion of document images to electronic documents can lead to literally thousands, tens of thousands, hundreds of thousands, millions, or more possible alternative conversions. In general, OCR methods and systems employ statistical reasoning, a wide variety of different types of metrics, and a wide variety of different types of automated hypothesis-testing techniques to constrain multi-way hypothesis generation and to accurately and efficiently navigate the potentially enormous state space of resolutions and electronic-document constructions to determine a single most likely electronic document corresponding to the document image.

Figure 7:
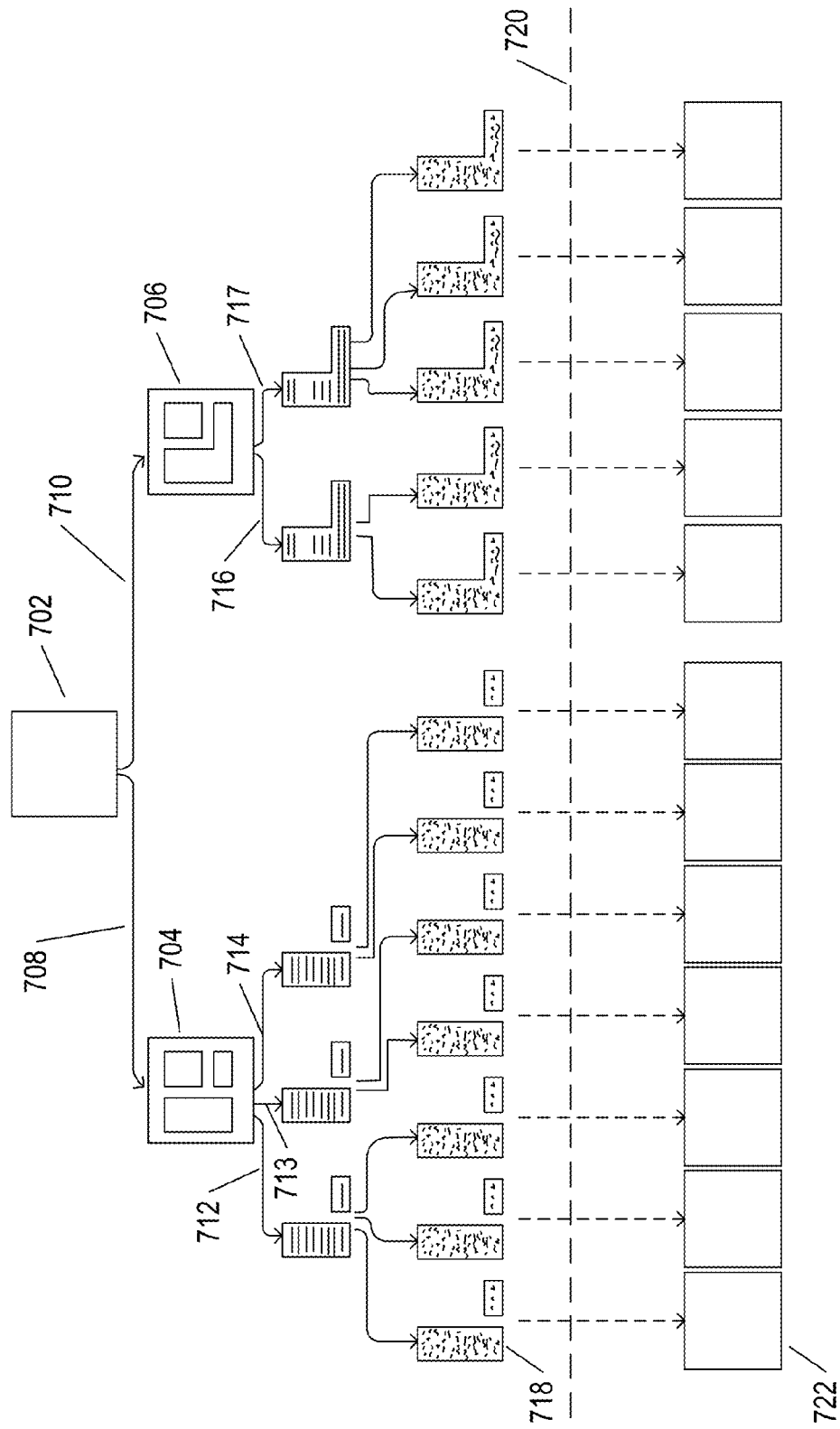
FIG. 7 alternatively represents the process of converting a document image into an electronic document used by various currently available OCR methods and systems.

FIG. 7 alternatively represents the process of converting a document image into an electronic document used by various currently available OCR methods and systems. The document image 702 is resolved into sets of highest-level image elements 704 and 706 via two alternative hypotheses 708 and 710, respectively. In a next level of resolution, the text-block images in the first initial resolution 704 and the single text-block image in the second initial resolution 706 are resolved into text-line images according to three different hypotheses 712-714 for the first highest-level resolution 704 and two hypotheses 716-717 for the second highest-level resolution 706. Each of these five different second-level resolutions are further resolved, in a next level of resolution, into individual symbol images according to multiple different hypotheses, finally generating 12 different leaf-node resolutions, such as leaf-node resolution 718. In a second phase of document-image-to-electronic-document conversion, each leaf-node resolution is constructed into generally multiple different possible corresponding electronic documents, such as electronic documents 722 corresponding to leaf-node resolution 718. FIG. 7 illustrates the potential multitude of electronic documents that may be produced via alternative hypotheses during the conversion process although, in actuality, the various alternative intermediate hypotheses and alternative electronic documents are filtered during the process so that a final, best-estimate electronic document is selected from among a reasonable number of alternatives during the final stages of electronic-document construction. In other words, although the potential state space of possible electronic documents is large, filtering and pruning occur throughout the resolution and construction phases so that the conversion process actually explores only a relatively minute subspace.

Figure 8:
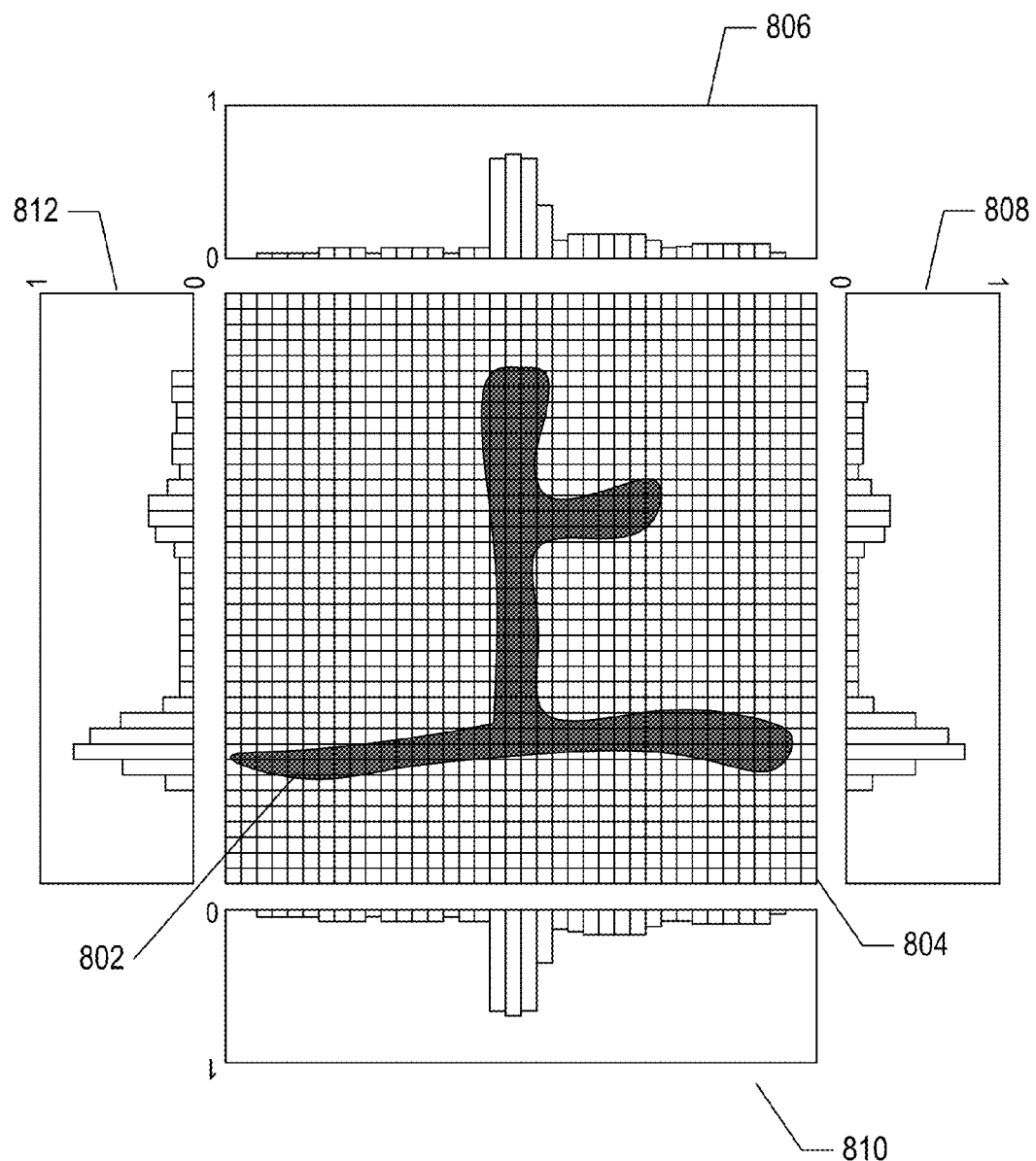
FIG. 8 illustrates one computational approach to determining the identity and orientation of the symbol within a symbol image.
Figure 9:
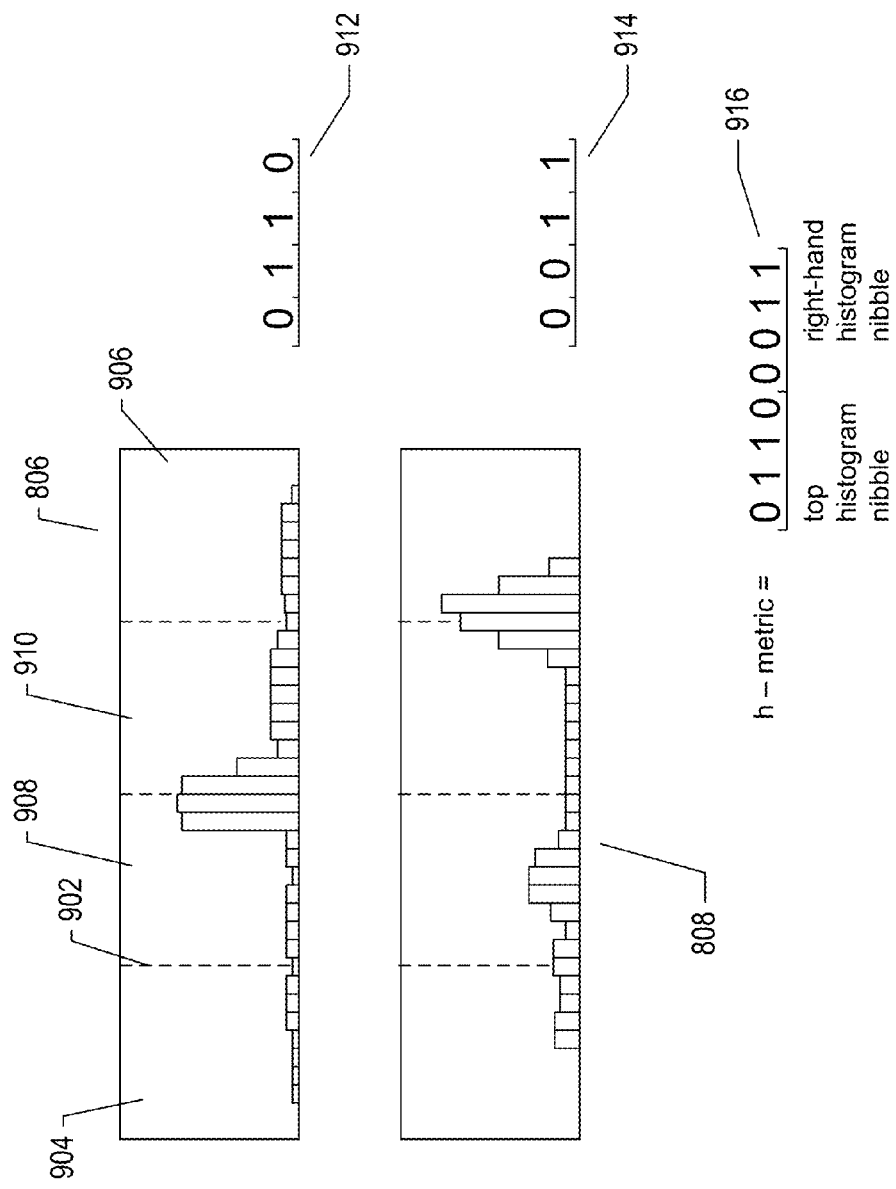
FIG. 9 illustrates one computational approach to determining the identity and orientation of the symbol within a symbol image.

FIGS. 8-9 illustrate one computational approach to determining the identity and orientation of the symbol within a symbol image. In FIG. 8, a character 802 is shown superimposed over a rectilinear grid 804. As in region 508 of FIG. 5, each grid element or cell represents a matrix of pixel elements, as a result of which the character edges appear smooth. At higher magnification, as in region 512 of FIG. 5, the character edges would appear jagged. As discussed above, these pixels are assigned either of two bit values "0" and "1," to indicate whether or not the pixel corresponds to a portion of the background or to a portion of the symbol, respectively. The fraction of pixels within each column of grid elements is plotted in histogram 806, shown above the rectilinear grid 804. This histogram represents the horizontal spatial distribution of character pixels within the rectilinear grid, which represents a single-character-containing portion of a scanned-document image. Similarly, histogram 808 shows the spatial distribution of symbol pixels in a vertical direction. Histogram 810 is related to histogram 806 by mirror symmetry, and histogram 812 is related to histogram 808 also by mirror symmetry. These histograms are signatures or fingerprints for character identification and orientation.

FIG. 9 illustrates a numeric metric that can be computed based on two of the four histograms shown in FIG. 8. In this figure, an orientation metric, referred to as the "histogram metric" or "h-metric," is computed from the top histogram and the right-hand histogram, 806 and 808, computed for a particular symbol in a particular orientation. Each histogram is partitioned into four regions by dashed vertical lines, such as dashed vertical line 902. Each region is assigned a value "0" or "1" depending on whether or not a histogram column within the region exceeds a threshold value, such as 0.5. These bit values are ordered in the same order as the partitions. Thus, for example, for histogram 806, there is no column in partitions 904 and 906 that exceeds the threshold value or height 0.5 while, in partitions 908 and 910, there is at least one column of the histogram that exceeds the threshold value or height 0.5. Thus, the bit values assigned to the partitions generate the four-bit nibble "0110" 912. A similar computation for the right-hand histogram 808 generates the four-bit nibble "0011" 914. These two four-bit nibbles can be concatenated to generate an eight-bit h-metric 916.

The h-metric is an example of a computed numerical characteristic that can be used to compare symbol images with canonical symbols of an alphabet or character set by an OCR system in order to identify symbol images. There are many examples of such feature characteristics or feature parameters that can be computed and compared to feature characteristics or feature parameters for a standard set of symbols in order to select a standard symbol most similar to a symbol image. Other examples include the ratio of the number of white pixels to the number of black pixels in a region of a binary symbol image, the relative lengths of the longest vertical, horizontal, and diagonal black-pixel lines within the binary symbol image, and other such computable metrics.

Figure 10B:
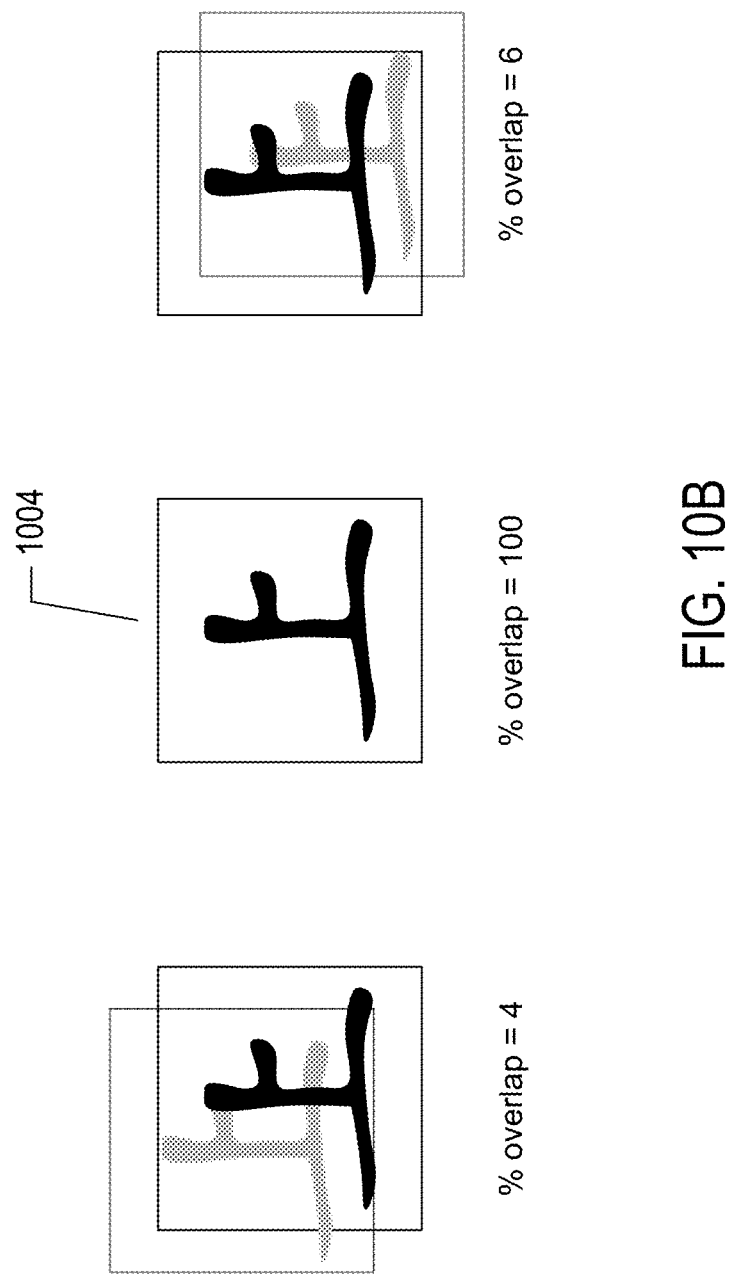
FIG. 10B illustrates a pattern-matching approach to symbol recognition by an OCR system.

FIGS. 10A-B illustrate a pattern-matching approach to symbol recognition by an OCR system. FIGS. 10A-B show a canonical symbol superimposed over a region of a binary document image 1002 containing a symbol image in a variety of different orientations. For each orientation, the percentage of pixels in the canonical symbol that overlap black pixels in the region of the binary document image containing the symbol image to produce an overlap metric, or o-metric. Prior to computing o-metrics for different orientations of the canonical symbol with respect to the symbol image, a scaling operation is carried out to ensure that the canonical symbol and symbol image have approximately the same size. A given symbol image can be compared to a set of canonical symbols, in various orientations, and the best matching canonical symbol may be selected as the canonical symbol for which the greatest o-metric is produced. For example, in FIG. 10B, the superposition 1004 produces 100% overlap. For greater accuracy, a two-way o-metric may be computed for the combined overlap of the canonical symbol with respect to the symbol image and for the symbol image with respect to the canonical image. This is one example of computational pattern-matching techniques that can be used to select a best-matching pattern for a symbol image based on standardized images for the symbols of an alphabet or character set.

Figure 11A:
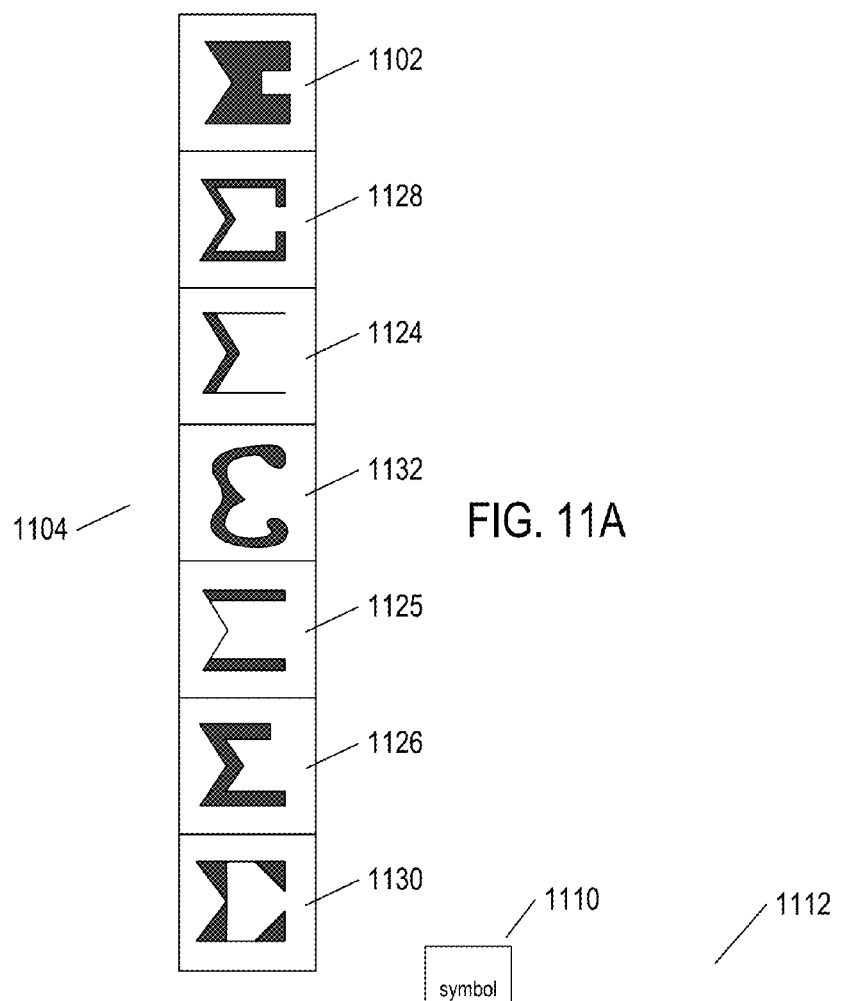
FIG. 11A illustrates various aspects of symbol sets for natural languages.
Figure 11B:
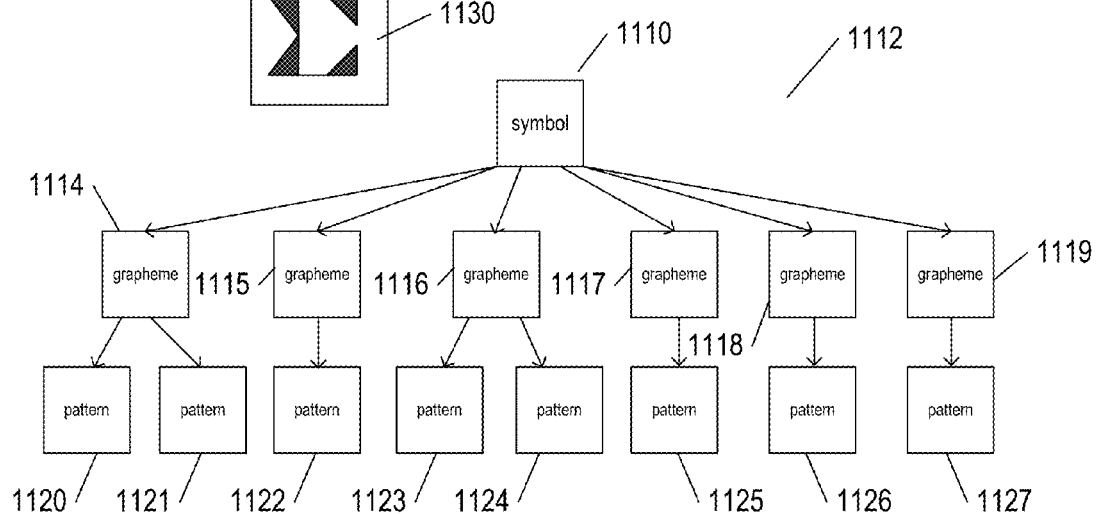
FIG. 11B illustrates various aspects of symbol sets for natural languages.

FIGS. 11A-B illustrate various aspects of symbol sets for natural languages. In FIG. 11A, a column of different forms of a symbol in a symbol set is provided. A first form of the symbol 1102 of the symbol set followed, in a column 1104, by different forms of the symbol in different styles of text. In many natural languages, there may be many different text styles and alternative written forms for a given symbol.

FIG. 11B shows various different concepts related to symbols of a natural language. In FIG. 11B, a particular symbol of a natural language is represented by node 1110 in graph 1112. A particular symbol may have numerous different general written or printed forms. For OCR purposes, each of these different general forms constitutes a grapheme. In certain cases, a particular symbol may comprise two or more graphemes. For example, Chinese characters may comprise a combination of two or more graphemes, each of which occurs in additional characters. The Korean language is actually alphabetic, with Korean morpho-syllabic blocks containing a number of alphabetic characters in different positions. Thus, a Korean morpho-syllabic block may represent a higher-level symbol composed of multiple grapheme components. For symbol 1110 shown in FIG. 11B, there are six different graphemes 1114-1119. There are, in addition, one or more different printed or written renderings of a grapheme, each rendering represented by a pattern. In FIG. 11B, graphemes 1114 and 1116 each has two alternative renderings represented by patterns 1120 and 1121 and 1123-1124, respectively. Graphemes 1115 and 1117-1119 are each associated with a single pattern, patterns 1122 and 1125-1127, respectively. For example, the symbol 1102 may be associated with three graphemes, including one grapheme that encompasses renderings 1102, 1124, 1125, and 1126, a second grapheme that encompasses renderings 1128 and 1130, and a third grapheme that encompasses rendering 1132. In this case, the first grapheme has straight horizontal members, the second grapheme has horizontal members with right-hand, short vertical members, and the third grapheme includes curved, rather than straight, features. Alternatively, all of the renderings of the symbol 1102, 1128, 1124, 1132, 1125, 1126, and 1130 may be represented as patterns associated with a single grapheme for the symbol. To a certain extent, the choice of graphemes is somewhat arbitrary. In certain types of character-based languages, there may be many thousands of different graphemes. Patterns can be thought of as alternative renderings or images, and may be represented by a set of parameter/parameter-value pairs, as discussed below.

Figure 11C:
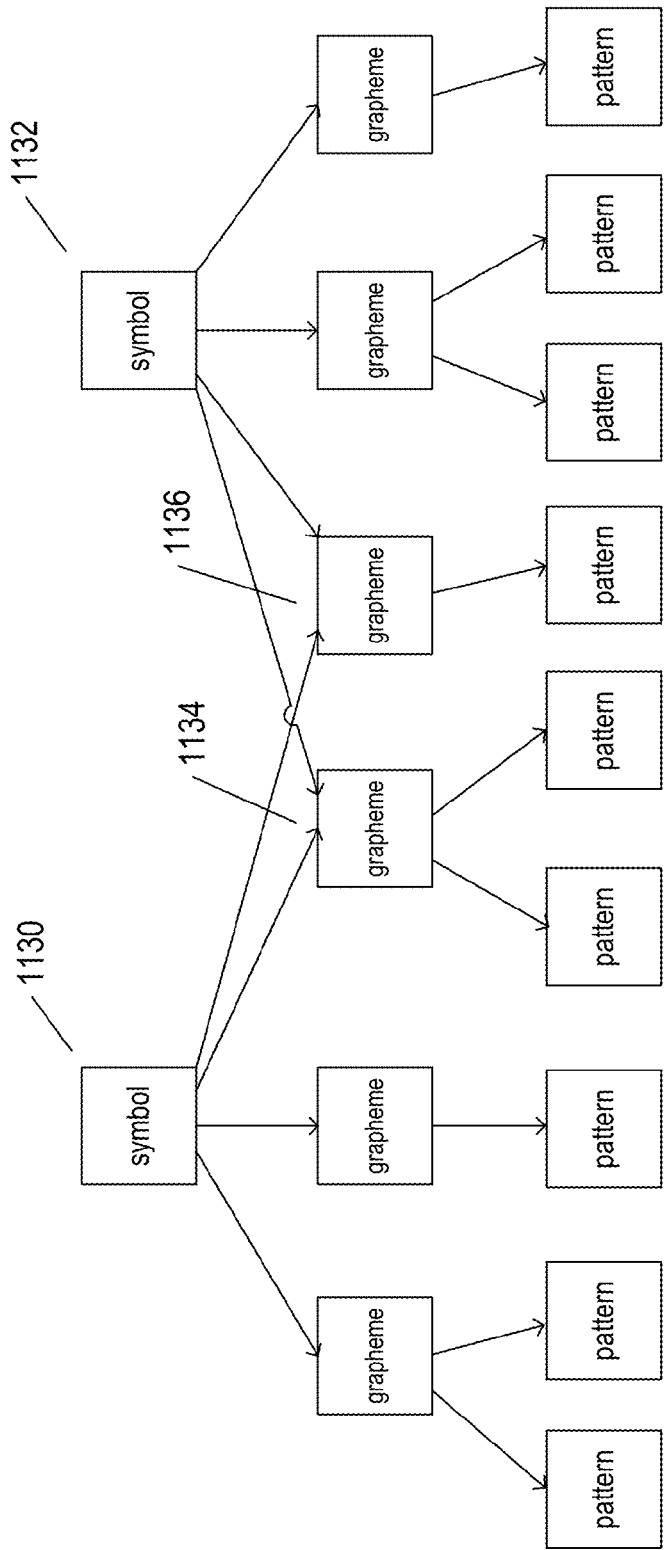
FIG. 11C illustrates various aspects of symbol sets for natural languages.

In fact, although the relationships between symbols, graphemes, and patterns is shown, in FIG. 11B, as being strictly hierarchical, with each grapheme related to a single, particular parent symbol, the actual relationships may not be so simply structured. FIG. 11C illustrates a slightly more complex set of relationships, in which two symbols 1130 and 1132 are both parents of two different graphemes 1134 and 1136. As one example, the English-language symbols "o," the lower-case letter, "O," the upper-case letter, "0," the digit zero, and "°", the symbol for degree, may all be associated with a circle-like grapheme. The relationships might alternatively be represented as graphs or networks. In certain cases, graphemes, rather than, or in addition to, symbols might be shown at the highest levels within the representation. In essence, there is a significant degree of arbitrariness in the symbols, graphemes, and patterns identified for a particular language and the relationships between them.

FIG. 12 illustrates a number of additional types of symbol recognition that can be used to recognize symbols within images and sub-images of text documents. In FIG. 12, an image of the letter "A" 1202 is shown. The above-described pattern-matching-based and parameter-based recognition techniques can be directly applied to the image 1202. Alternatively, the symbol image 1202 can be initially processed to produce a symbol structure 1204 or a symbol contour 1206. The symbol structure 1204 may be computed as the set of lines and curves that represent a kind of collection of local centers of masses of the symbol image. The symbol contour 1206 is a collection of lines and curves that represent the external and internal borders of the symbol. Pattern-matching and feature-based recognition techniques, such as those described above, can then be applied to either the symbol structure 1204 or symbol contour 1206, using symbol-structure patterns and metrics or symbol-contour features and metrics, respectively.

Figure 13A:
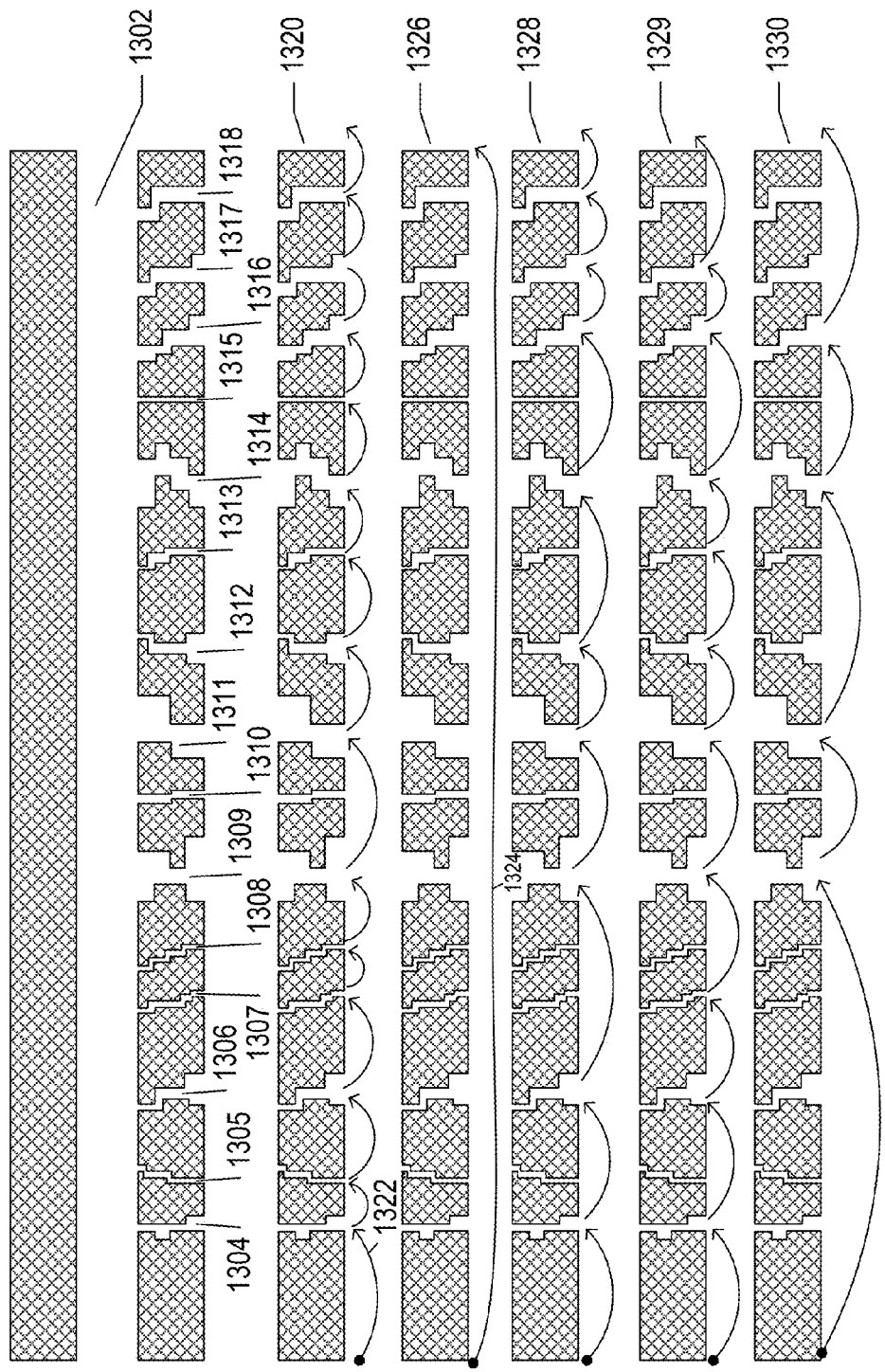
FIG. 13A illustrates a type of classifier that may be used to generate hypotheses with respect to resolving an image of a line of text into a sequence of symbol images.
Figure 13B:
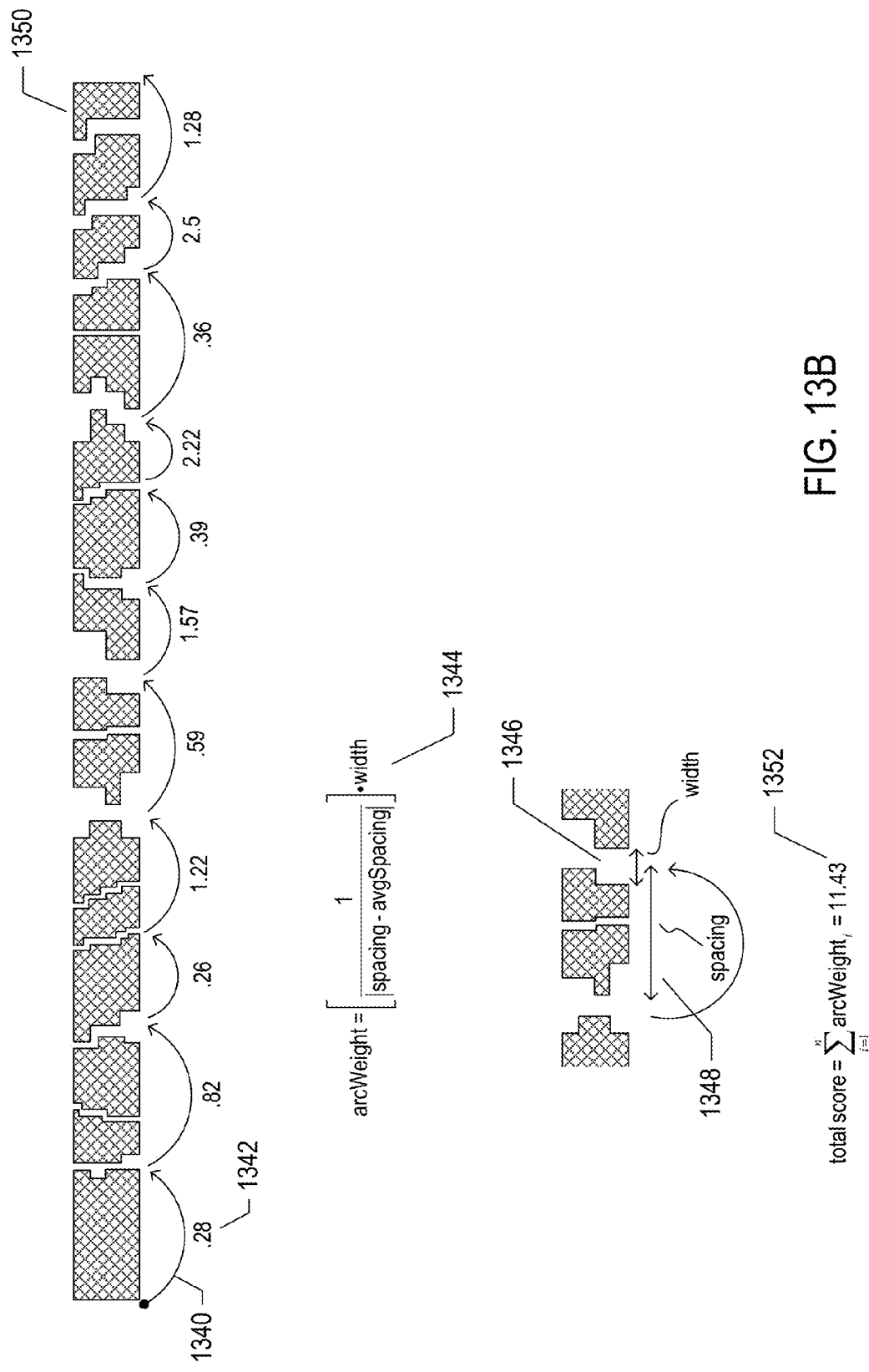
FIG. 13B illustrates a type of classifier that may be used to generate hypotheses with respect to resolving an image of a line of text into a sequence of symbol images.

FIGS. 13A-B illustrate a type of classifier that may be used to generate hypotheses with respect to resolving an image of a line of text into a sequence of symbol images. This type of classifier is illustrated abstractly in FIGS. 13A-B. At the top of FIG. 13A, a text-line image 1302 is represented as a cross-hatched horizontal bar. In a first step undertaken by the third type of classifier, contiguous non-character bits within the bitmap corresponding to the text line that span the width of the text line are identified. These are shown as gaps 1304-1318. Next, the classifier may consider all possible paths that lead from the beginning of the text line to the end of the text line through the identified white-space gaps. For example, a first path that traverses all of the identified gaps is illustrated with respect to text line 1320, where the path consists of a series of arcs, such as arc 1322. There are 15 gaps (1304-1318) and therefore 15 different arcs in the path illustrated with reference text line 1320. At the other extreme, there is a path consisting of a single arc 1324 illustrated with respect to text line 1326. Three additional paths are illustrated with respect to text lines 1328-1330. Each possible path represents a different hypothesis with respect to grouping regions of the text-line image into higher-level elements. A graph containing various different gap-traversing paths is referred to as a "linear-division graph."

In order to control the potential combinatoric explosion that would ensue by considering every possible hypothesis, or path, as a separate resolution during a document-image-conversion process, the possible paths are generally scored, and only the top-scoring path or some number of top-scoring paths are selected as hypotheses. FIG. 13B illustrates path scoring. In the approach shown in FIG. 13B, each arc, such as arc 1340, is associated with a weight, such as the weight 0.28 1342 associated with arc 1340. There are many ways to compute an arc weight. In one example, the arc weight is computed 1344 as the width of the white-space gap at the base of the text line to which the arc points 1346 times the inverse of the absolute value of the difference between the spacing represented by the arc 1348 and an average spacing for the text line, a text block including the text line, or some other higher-level image element. This particular arc-weight calculation 1344 assumes that the wider the gap, the more likely the gap represents a boundary between symbols or words and that the lengths of symbols or words fall about an average length. This third type of classifier may be used to resolve text lines into symbols, in one case, or to resolve text lines into words, in another case. The weighting function to determine arc weights may vary depending on whether the text line is being resolved into symbols or into words. The final score for the hypothesis represented by a particular path that traverses the white-space gaps, such as the path represented by the arcs in text line 1350 in FIG. 13B, is computed as the sum of the weights of the individual arcs 1352.

Challenges in Processing Images of Mathematical Expressions

FIGS. 14A-B provide a number of examples of mathematical expressions as well as indications of features in the mathematical expressions that complicate and frustrate currently-used OCR methods applied to document sub-images that contain mathematical expressions. FIG. 14A shows five different mathematical equations 1402-1410 selected from textbooks of a variety of different quantitative fields. Expression 1402, for example, is taken from a calculus textbook, equation 1406 is taken from a tensor-calculus textbook, and equations 1408 and 1410 are taken from a quantum-computing textbook. To a human reader familiar with college-level mathematics and physics, all of the equations shown in FIG. 14A are easily interpretable. However, from the standpoint of automated OCR methodologies, the recognition of these mathematical expressions in document images and sub-images presents numerous challenges.

FIG. 14B illustrates certain of the challenges encountered in automated OCR methods applied to the mathematical expressions shown in FIG. 14A. As one example, quite often in mathematical expressions, a given type of symbol may have a variety of different appearances, or instances, in different expressions. For example, consider the integral symbol 1412 and the double-integral symbol 1414 in expression 1402. An integral symbol may occur singly or in multiples, depending on the dimensionality of the integration that the integral symbol or symbols represent. An integral symbol may be associated with lower and upper limits of integration, as the integral symbol 1412 in equation 1402. However, the positions of the lower and upper limits may differ in different expressions relative to the integral symbol $\int$. In certain cases, the limits may be below and above the integral symbol and, in other cases, may appear to the right of the top and lower portions of the integral symbol, as in the case of integral symbol 1412 in expression 1402. In the case of indefinite integrals, neither lower nor upper limits of integration are included with the symbol. In other cases, such as the double-integral 1414 in expression 1402, the limits of integration are more abstractly represented, in this case by the capital letter "R" that appears below the pair of integral symbols. Normally, limits of integration are expressed using font sizes that are substantially smaller than the font size of the integral symbol, but the difference in font sizes may vary in different mathematical expressions. The limits of integration may be individual symbols or may be entire mathematical expressions. Simple pattern matching or feature-based recognition methods are difficult to apply to mathematical expressions that employ collections of symbols with well-defined meanings but many different potential instances.

Another challenge in mathematical expressions is the presence of subscripts and superscripts. For example, the function notation 1416 in equation 1404 represents a function $f_k$ that takes a single parameter z. However, there are additional possible interpretations. For example, the expression could mean multiplication of a number $f_k$ by the parenthesized expression z or might be alternatively interpreted as the product of the three numbers $f$, k, and z. In many cases, the difference in font sizes between a base symbol and a subscript of that symbol may widely vary in different expressions, as can the relative positions of the base symbol and subscript. Even greater complexities may arise when subscripts and superscripts of base symbols are themselves mathematical expressions. For example, the subscripted symbol "E" 1418 in equation 1404 has, as a subscript, the expression $q^k-1$. However, an automated OCR system may not know whether this entire expression is a subscript or whether the q is the subscript and the k−1 is a multiplier of "E" or potentially somehow associated with the following symbol (z). Matrix elements, such as element 1420 in equation 1406, may also be challenging for an automated OCR system. Matrix element 1420 is a fraction and is an element of a 2×2 matrix, the fraction including a denominator with a superscripted x. An automated OCR system that fails to recognize this fraction as an element of a matrix may instead consider many different possible roles for these symbols, including an expression in which the fraction 1420 multiplies the matrix element to its left or is itself a denominator of a higher-level fraction with the numerator "0." There may be an arbitrary level of nesting of sub-expressions within mathematical expressions that are readily interpretable by humans but that are difficult to analyze by automated OCR methods that cannot consider the full mathematical context in which individual symbols are employed. Another example of the multiple levels of nesting is the subscript 1422 of the number e in expression 1408, which is a fraction that contains another fraction as its denominator. Note that the higher-level fraction has a horizontal fraction bar while the lower-level fraction has a diagonal fraction bar. In this same equation, a brace 1424 appears without a corresponding closing brace. Often, in mathematical expressions, braces, brackets, and parentheses occur in pairs, but occasionally they do not. In many fields, symbols may have particular, field-specific meanings. For example, in equation 1410, the notation 1426 refers to a vector and the notation 1428 indicates bitwise modulo-2 addition. An automated OCR system without knowledge of the context of the expression may easily misinterpret such symbols.

The above-mentioned examples are but a few of the many challenges presented by mathematical expressions to an OCR system. Mathematical expressions generally have arbitrary levels of nestings, employ many types of specialized symbols that have different meanings and usages in different contexts, and employ many different specific conventions for representing particular concepts. When mathematical symbols are encoded within electronic documents, such as by using the Microsoft Equation Editor, Math Type Equation Editor, or LaTeX encodings, the precise roles of each symbol need to be understood, as well as the levels of nesting at which symbols occur. As one example, in many mathematical-expression-encoding systems, paired brackets, braces, or parentheses are specified by a single initial input, with the symbols occurring within the paired brackets, braces, or parentheses following the bracket-pair input. In order to properly encode the symbol, an OCR system needs to recognize paired braces, brackets, and parentheses at each level of nesting.

Methods and Systems to which the Current Document is Directed

The current document is directed to methods and systems, including subsystems within automated OCR systems, that process document images and sub-images containing mathematical expressions in order to transform images of mathematical expressions into electronic encodings of the mathematical expressions. As discussed above with reference to FIGS. 11A-C and 12, OCR processing of document images decomposes a document image into blocks, or sub-images, of various types which are then processed according to processing methods appropriate for the types. Mathematical expressions represent yet another type of block or sub-image that is processed by implementations of the currently discussed methods and systems that transform images of mathematical expressions into corresponding electronic encodings.

Figure 15C:
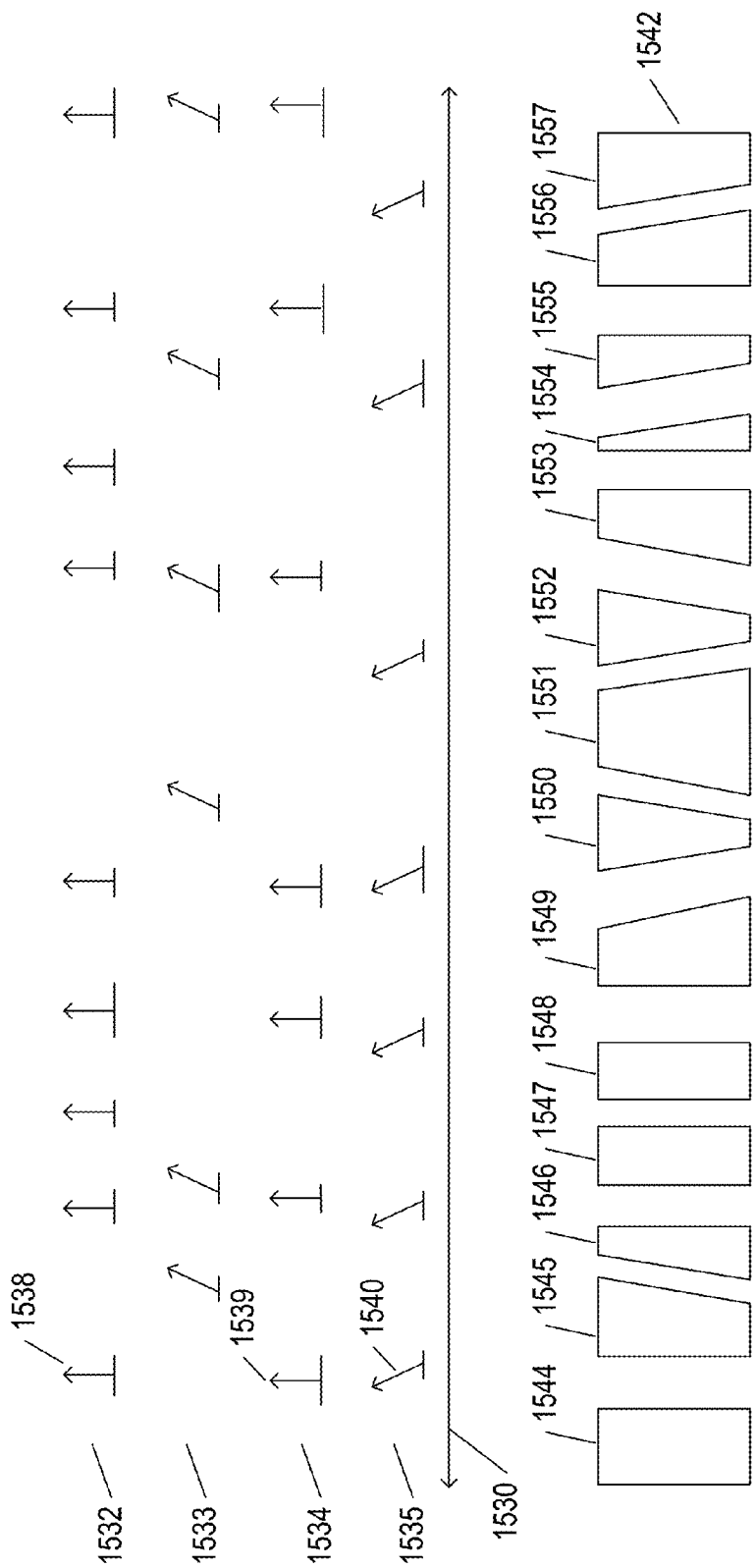
FIG. 15C illustrates one implementation of a mathematical-expression-blocking method that partitions an image or sub-image containing a mathematical expression into lower-level blocks or partitions.

The methods for processing images and sub-images of mathematical expressions to which the current document is directed involve recursive, alternating application of image-blocking techniques in order to hierarchically subdivide the images or sub-images containing mathematical expression into elemental blocks that each correspond to particular symbols. FIGS. 15A-F illustrate one implementation of a mathematical-expression-blocking method that partitions an image or sub-image containing a mathematical expression into lower-level blocks or partitions. FIG. 15A shows the equation 1402 of FIG. 14A over which a set of vertical parallel lines has been superimposed. These vertical lines, such as vertical line 1502, divide the image of mathematical expression 1402 into a set of contiguous, parallel, vertical stripes. The granularity of the striping, or widths of the stripes, is relatively large in the example shown in FIG. 14A, for clarity of illustration. However, stripes as narrow as the widths of one or two pixels can be used in certain implementations. The blocking method, after partitioning the image of the equation into vertical stripes, may count the number of pixels within each stripe corresponding to symbols in order to generate a histogram with respect to consecutive intervals along the horizontal axis of the expression image that shows the number of pixels corresponding to symbols for each interval of the x axis representing the intersection of a vertical stripe with the horizontal axis or, alternatively, the percentage of pixels corresponding to symbols in each vertical stripe. The method then identifies all single vertical stripes and contiguous sets of vertical stripes that contain less than a threshold number of pixels corresponding to symbols as candidate partition borders. In the case of binary images, the number of pixels with value "1" within each vertical stripe is counted, in one implementation of the blocking method. Rather than computing an entire histogram, the blocking method can alternatively count pixels corresponding to symbols up to the threshold value, for each vertical stripe, identifying those vertical stripes having less than the threshold number of pixels corresponding to symbols as "0" vertical stripes and the remaining vertical stripes as "1" vertical stripes. In other words, a full histogram need not be computed, but only a binary histogram that distinguishes the vertical stripes with less than a threshold number of pixels corresponding to symbols from the vertical stripes with a threshold or greater number of pixels that correspond to the symbols. Each set of one or more contiguous vertical stripes having less than a threshold number of pixels corresponding to symbols represents a candidate partition border for partitioning the mathematical expression into lower-level blocks. These candidate partition borders are also referred to a "vertical white-space stripes." Rather than using pixels, other techniques that determine the percentage of the area of the stripe corresponding to one or more symbols can be employed.

In FIG. 15A, the sets of contiguous vertical stripes with less than a threshold number of pixels corresponding to symbols are identified by directed U-like marks, such as U-like mark 1504. As can be seen in FIG. 15A, the large-granularity striping identifies only a portion of the potential vertical partition borders that can be visually identified as partitioning the mathematical expression 1402 into discrete symbols or symbol groups along the horizontal axis. For example, a potential vertical partitioning border lies between the superscript 2 (1506 in FIG. 15A) and the differential symbol 1508, and would be identified by the histogram-based methods were the grid of parallel vertical lines slighted shifted horizontally with respect to the mathematical expression. When a fine granularity of vertical striping is employed, this and many additional potential partition borders are found by the histogram-based method. Alternatively, a lower-granularity vertical striping, such as that shown in FIG. 15A, can be used multiple times, shifting the relative positions of the vertical lines with respect to the mathematical expression systematically to the left or right for each use. In this way, potential vertical partitioning borders, such as the potential vertical partitioning border lying between the superscript 2 (1506 in FIG. 15A) and the differential symbol 1508, are identified during at least one use of the histogram-based method. In either case, using strictly vertical lines may not reveal all possible logical partition lines. For example, it would be logical to partition the differential symbol 1510 from the following variable symbol "r" 1511. However, because the stem of the differential symbol 1510 is not vertical, the top of the stem overlaps the left-most part of the symbol "r" 1511 in a vertical projection onto the horizontal axis. Therefore, no vertical white-space stripe that can be constructed between these two symbols that does not contain pixels of at least one of the symbols. In order to find these types of candidate partitions, a different sloping of lines of the set of parallel lines that define stripes may be employed. In FIG. 15B, the lines of the set of parallel lines are not perpendicular to the horizontal axis, but are instead somewhat slanted. As a result, were the granularity of the slanted stripe 1514 slightly smaller, it would contain no pixels corresponding to symbols and would thus be identified as a candidate partition border.

To carry out blocking along the horizontal axis, therefore, the blocking method generally applies a number of steps, in each of which a logical set of parallel lines is superimposed over the image of the mathematical formula as potential partition borders, with the relative positions of the lines and/or directions of the lines varied in each step. The superposition is logical, in that the lines are logical constructs that define the borders of potential partitions, and are not actually drawn onto or incorporated into the image or sub-image of the mathematical expression. For example, a number of steps may be used with line directions varying from 70° to 110° degrees, at five-degree or ten-degree intervals, and with the relative positions of the parallel lines shifted by a small amount for each step. The candidate partition borders identified in each step are accumulated and a final set of partition borders are selected from the accumulated set of candidate partition borders.

FIG. 15C illustrates the selection of partitions from a set of candidate partitions. In the example shown in FIG. 15C, the long double-headed horizontal arrow 1530 represents the horizontal axis, or x-axis, of the mathematical-expression image. Four candidate-partition-selection steps are represented by the four rows of short arrow symbols 1532-1535. Each short-arrow symbol, such as short-arrow symbol 1538, includes an arrow that indicates the direction of the lines of the set of parallel lines that describe the stripes logically overlaid on the image of the mathematical formula during the candidate-partition-selection step and a horizontal base line segment that indicates the width of a set of one or more stripes that contain less than a threshold number of pixels corresponding to symbols. When two or more candidate partitions, such as candidate partitions 1538-1540, overlap along the x axis 1530, the base line segments for all candidate partitions having the same direction are coalesced and, after coalescing candidate partitions with the same direction, the widest coalesced candidate partition, or, in other words, the coalesced candidate partition with the longest base line segment, is selected as a partition. Candidate partitions that do not overlap with other candidate partitions are selected as partitions, as well. In FIG. 15C, a representation of the area of the image of the mathematical formula 1542 is partitioned by the partitions selected from the candidate partitions of rows 1532-1535, leaving a set of blocks 1544-1557 that represent the results of partitioning of the image of the mathematical expression into lower-level blocks or partitions. Two candidate partition borders may be defined to overlap, in certain implementations, when either they physically intersect or when a line segment connecting a point on each of the two candidate partition borders is shorter than a threshold distance.

Figures 15D, 15E:
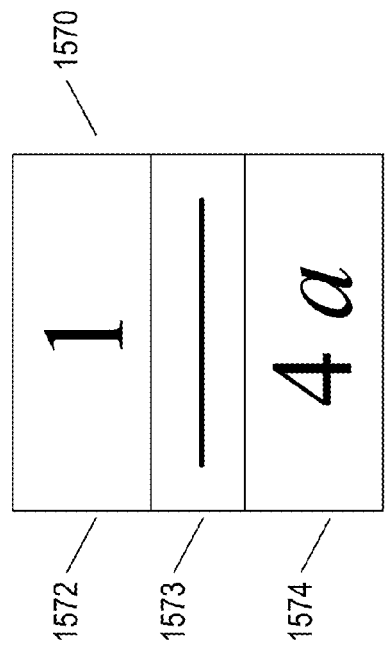
FIG. 15D illustrates one implementation of a mathematical-expression-blocking method that partitions an image or sub-image containing a mathematical expression into lower-level blocks or partitions.
FIG. 15E illustrates one implementation of a mathematical-expression-blocking method that partitions an image or sub-image containing a mathematical expression into lower-level blocks or partitions.

FIG. 15D illustrates a first-level horizontal partitioning of an image of the mathematical expression 1402 of FIG. 14A using the method described above with reference to FIGS. 15A-C. The partition lines, such as partition line 1560, are centered within portions of the image through which vertical or slanted white-space stripes can be constructed. In some cases, such as for partitions 1562 and 1564, each partition, or block, contains a single symbol. In other cases, such as partition 1566, horizontal partitioning is unable to generate single symbols due to the presence of the horizontal bar of the fraction $$\frac{1}{4a}.$$

As shown in FIG. 15E, a similar partitioning or blocking method can be used to vertically partition an image or sub-image that includes a mathematical expression. In FIG. 15E, a sub-image 1570 that contains the fraction $$\frac{1}{4a}$$

can be vertically partitioned into the three partitions 1572-1574. Application of a vertical partitioning step to partition 1566 obtained by horizontal partitioning of the original image generates second-level partitions, two of which include single symbols and one 1574 of which includes two symbols. Horizontal partitioning of the second-level partition 1574 can then produce two third-level partitions, each containing a single symbol. Alternating application of horizontal and vertical partitioning, or blocking, applied recursively, can thus be used to recursively divide an image or sub-image containing a mathematical expression into a hierarchical set of image blocks, the smallest of which each contains a single symbol.

Figure 15F:
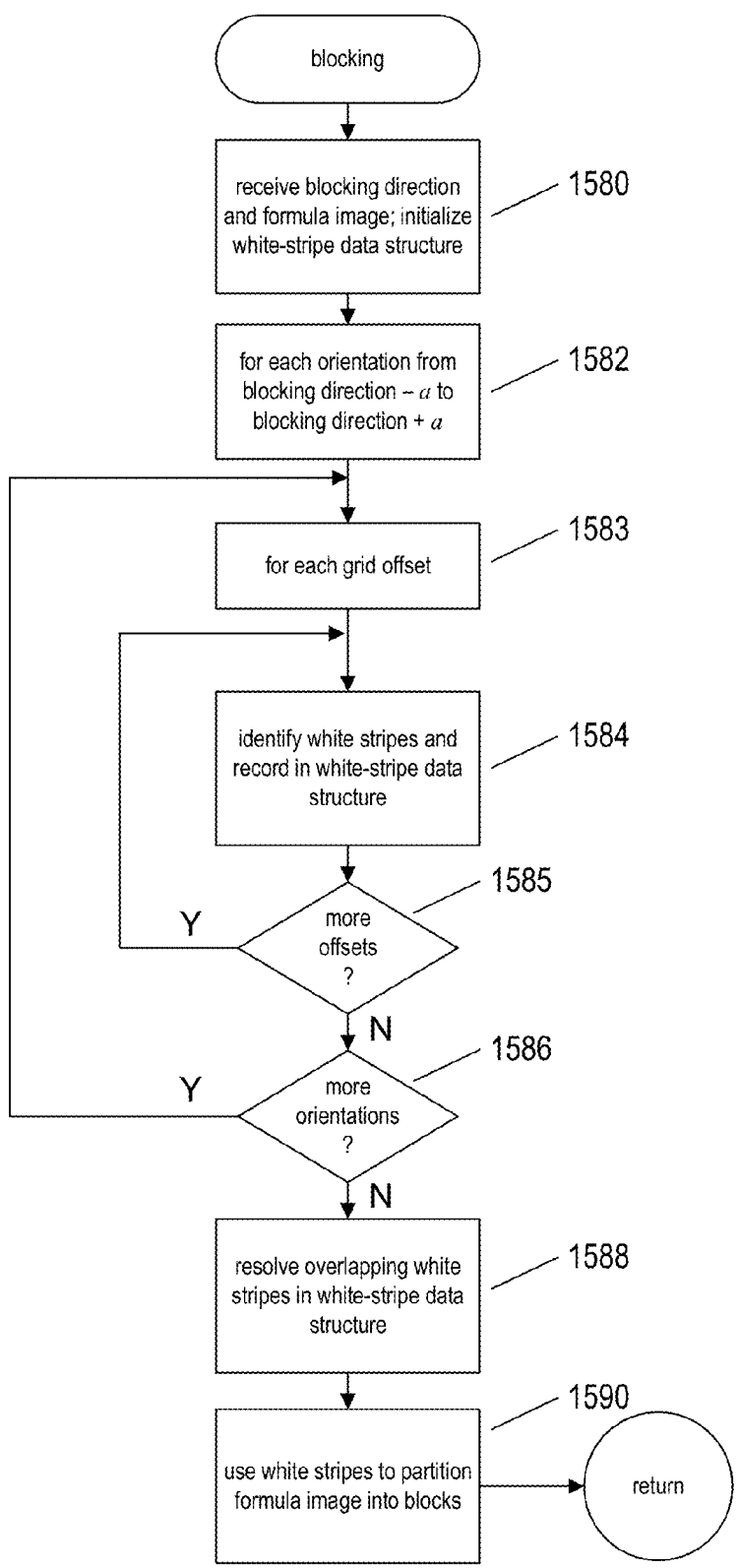
FIG. 15F illustrates one implementation of a mathematical-expression-blocking method that partitions an image or sub-image containing a mathematical expression into lower-level blocks or partitions.

FIG. 15F provides a control-flow diagram for one implementation of a blocking method that divides an image containing a mathematical expression into blocks along a specified direction. In the implementations of the mathematical-expression-processing methods and systems to which the current document is directed, blocking is applied either in a horizontal direction using vertical and near-vertical striping or in a vertical direction using horizontal and near-horizontal striping. The control-flow diagram shown in FIG. 15F describes both vertical and horizontal blocking. In step 1580, the routine "blocking" receives a blocking direction, either horizontal or vertical, and an image or sub-image that contains a mathematical expression or formula as two arguments. The routine "blocking" initializes a white-stripe data structure to store indications of all identified sets of one and two or more contiguous stripes orthogonal to the blocking direction that each contain less than a threshold number of pixels corresponding to symbols within the received image or sub-image. In the nested for-loops of step 1582-1586, the routine "blocking" carries out a series of candidate-partition-selection steps as described above with reference to FIGS. 15A-B. The outer for-loop of steps 1582-1586 iterates over a series of parallel-line orientations from an angle −a to +a about a direction orthogonal to the blocking direction. For example, when the blocking direction is horizontal, then the series of orientations may start at 80° and end at 100°, spanning 10° on either side of the vertical direction of 90° degrees. The angle may be incremented by some number of degrees, such as five degrees, for each next iteration of the outer for-loop. The inner for-loop of steps 1583-1585 iterates over some number of successive repositioning of the stripes orthogonal or nearly orthogonal to the blocking direction with respect to the blocking direction. For very fine-granularity striping, the inner for-loop may be unnecessary. For larger-granularity striping, as illustrated in FIGS. 15A-B, the stripe width may be divided by an integer, such as four, to generate an increment and the inner for-loop may iterate a number of times equal to the integer, after each iteration shifting the positions of the stripes by the computed increment in a selected direction along the blocking direction. Once a number of candidate partitions have been selected in the nested for-loops of steps 1582-1586 and stored in the white-stripe data structure, overlapping white stripes are resolved, in step 1588, as described above with reference to FIG. 15C, and the remaining white stripes following resolution are used to partition the formula image into blocks, in step 1590, as discussed above with reference to FIGS. 15C-D.

In order to process a mathematical formula, the horizontal and vertical blocking, discussed above, is applied recursively until the mathematical formula is reduced to graphemes recognizable as symbols by the above-described OCR approaches. Each set of recognized symbols obtained by recursive blocking is then processed using a graph-based processing step, to transform the sequence of recognized symbols into a graph-based representation of the mathematical formula.

Figure 16A:
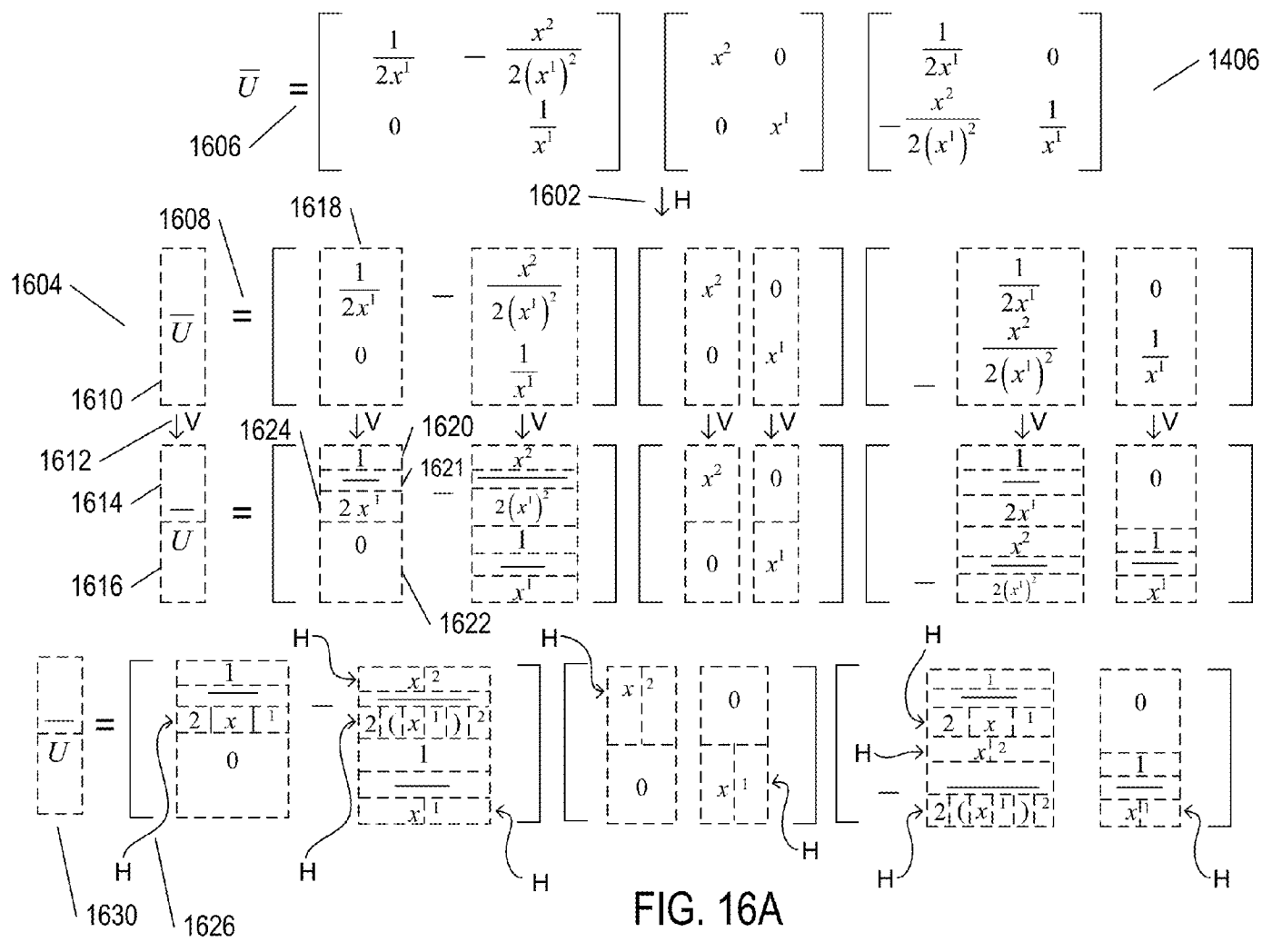
Figure 16B:
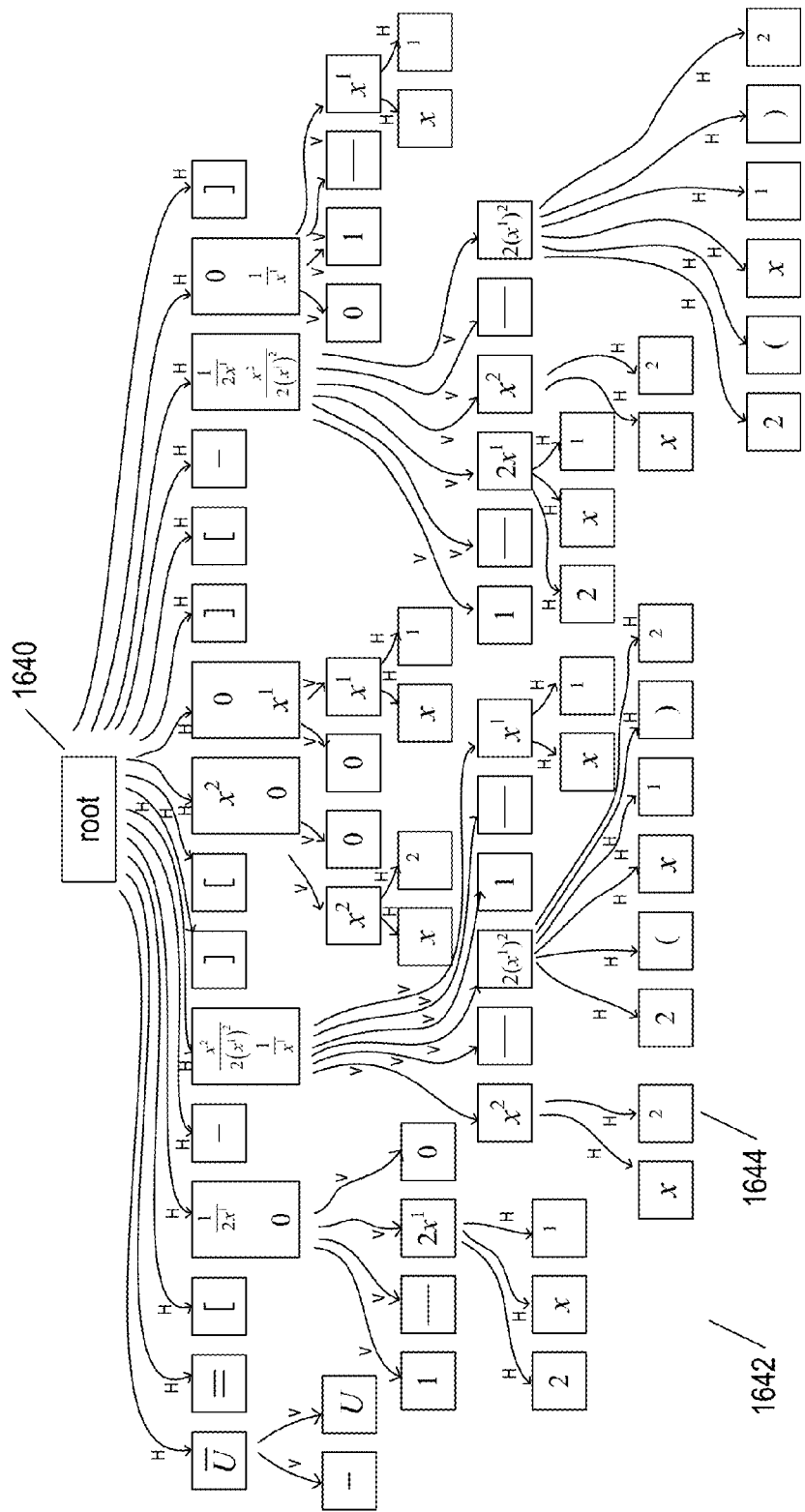
FIG. 16B illustrates a recursive-blocking and graph-based approach to recognition of mathematical formulas during OCR processing of a document image.

FIGS. 16A-B illustrate a recursive-blocking and graph-based approach to recognition of mathematical formulas during OCR processing of a document image. At the top of FIG. 16A, expression 1406 from FIG. 14A is again shown. In a first step, represented by arrow 1602 and the annotating "H" symbol, the document sub-image containing this expression is subjected to horizontal blocking. Following horizontal blocking, OCR methods, such as those discussed above, are applied to each block in order to recognize one or more symbols within the block. In FIG. 16A, the results of horizontal blocking and application of OCR methods to each block are shown in row 1604. Those blocks for which application of OCR methods produce recognized symbols are indicated by the recognized symbols. For example, horizontal blocking produced a block that contains the equals sign 1606. Application of OCR methods to this block produced the recognized equals-sign symbol. Thus, the block is represented in FIG. 16A by the equals sign 1608. Those blocks for which application of OCR methods does not produce recognized symbols are shown, in row 1604 in FIG. 16A, as dashed rectangles, such as dashed rectangle 1610. In the case of block 1610, OCR methods are unable to recognize a capital U with a bar vertically positioned over the capital U. Next, the blocks for which application of OCR methods does not produce recognized symbols are subjected to a recursive vertical blocking, as indicated by arrows annotated with the letter "V," such as arrow 1612. In the case of block 1610, vertical blocking produces the bar symbol, shown in dashed rectangle 1614, and the U, shown in rectangle 1616. However, in the case of block 1618, recursive vertical blocking produces three symbols 1620-1622 as well as a block 1624 that does not result in a recognized symbol upon application of OCR methods. Thus, again, after vertical blocking, OCR methods are applied to each resulting block, resulting in either recognized symbols or in lower-level blocks to which horizontal blocking is then recursively applied. In FIG. 16A, curved arrows annotated with the letter "H," such as arrow 1626, indicate recursively applied horizontal blocking to blocks that do not produce symbols upon application of OCR methods. In the final row 1630 shown in FIG. 16A, each discrete symbol in the equation contained in equation image 1406 has been recognized by application of OCR methods. Thus, in the case of equation image 1406, three recursively applied levels of blocking are needed to partition the equation image into sub-images, each of which contains a grapheme recognizable by OCR methods as a symbol.

FIG. 16B illustrates the recursive application of blocking to the equation sub-image 1406 shown in FIG. 16A using a different set of illustration conventions. In FIG. 16B, the document sub-image containing the expression contained in sub-image 1406 in FIG. 16A is represented by a root node 1640. The recursive application of blocking results in production of a tree 1642 in which the leaf nodes, such as leaf node 1644, correspond to smaller sub-images that each contain a grapheme recognizable by application of OCR methods as a symbol.

Figure 17A:
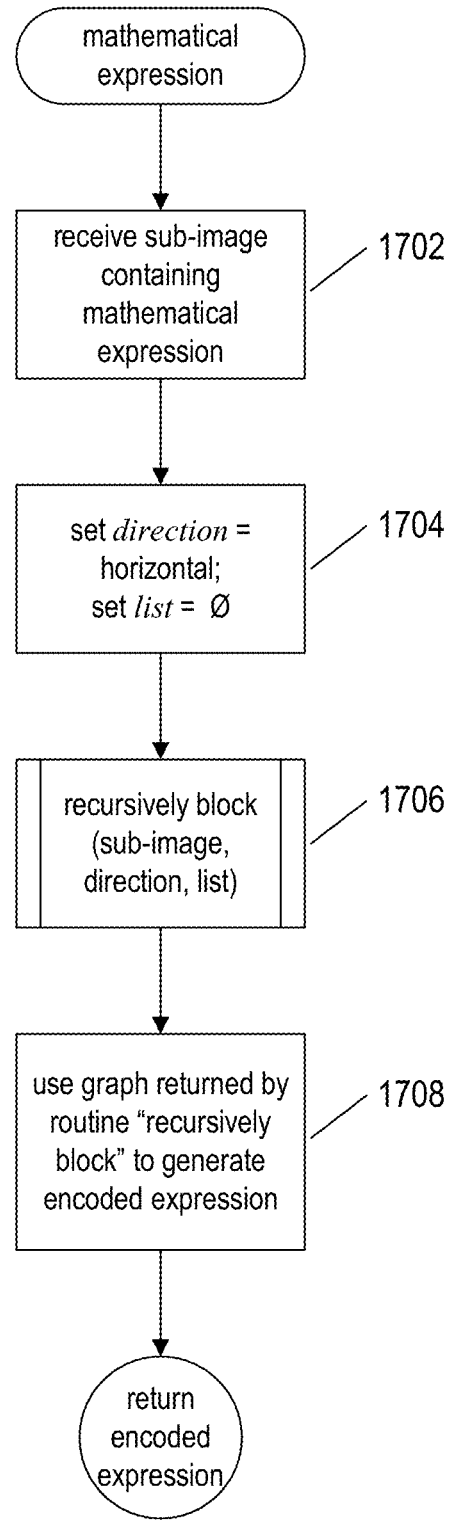
FIG. 17A provides control-flow diagrams that illustrate one implementation of the mathematical-expression-containing document-image processing to which the current document is directed.
Figure 17B:
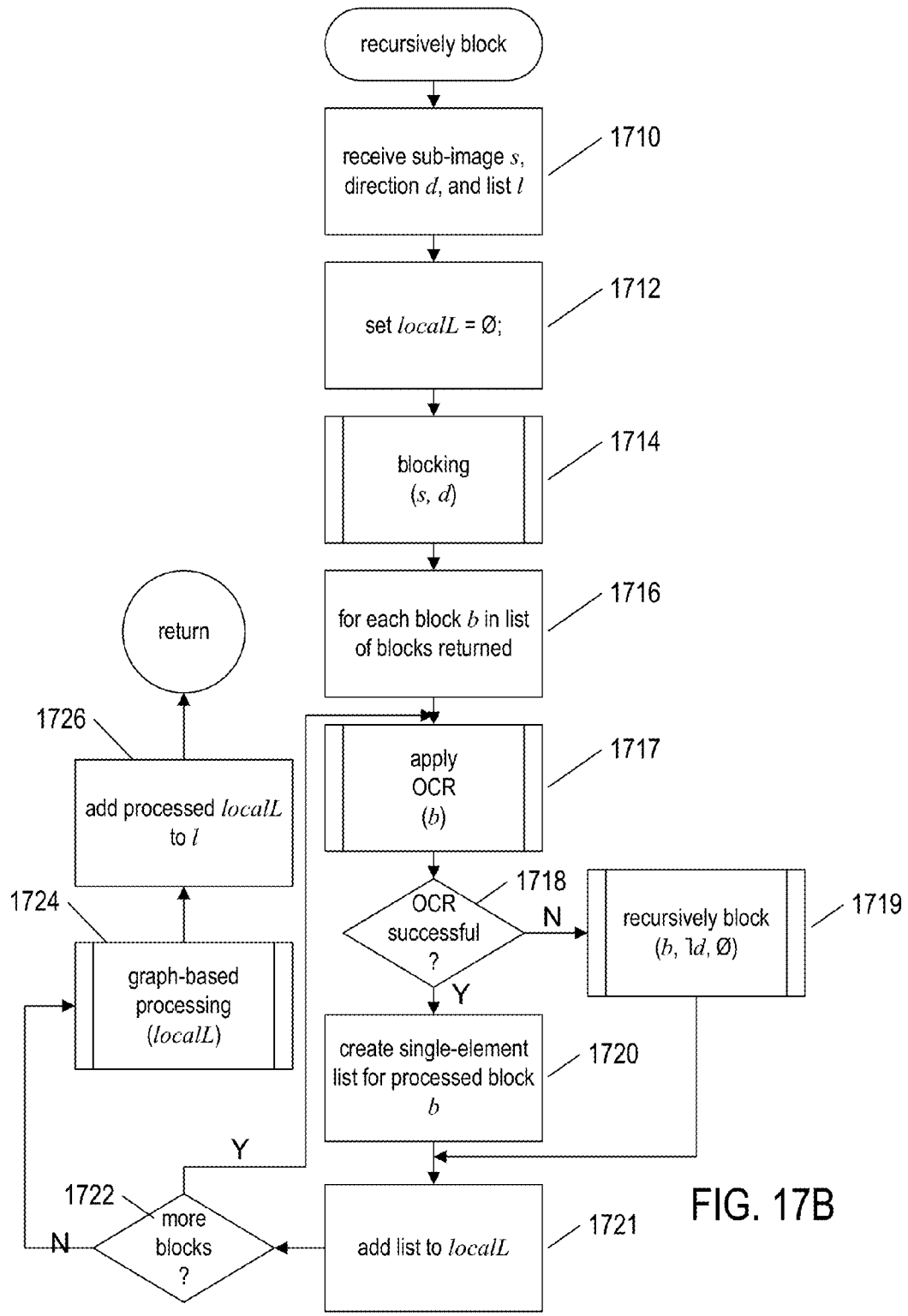
FIG. 17B provides control-flow diagrams that illustrate one implementation of the mathematical-expression-containing document-image processing to which the current document is directed.
Figure 17C:
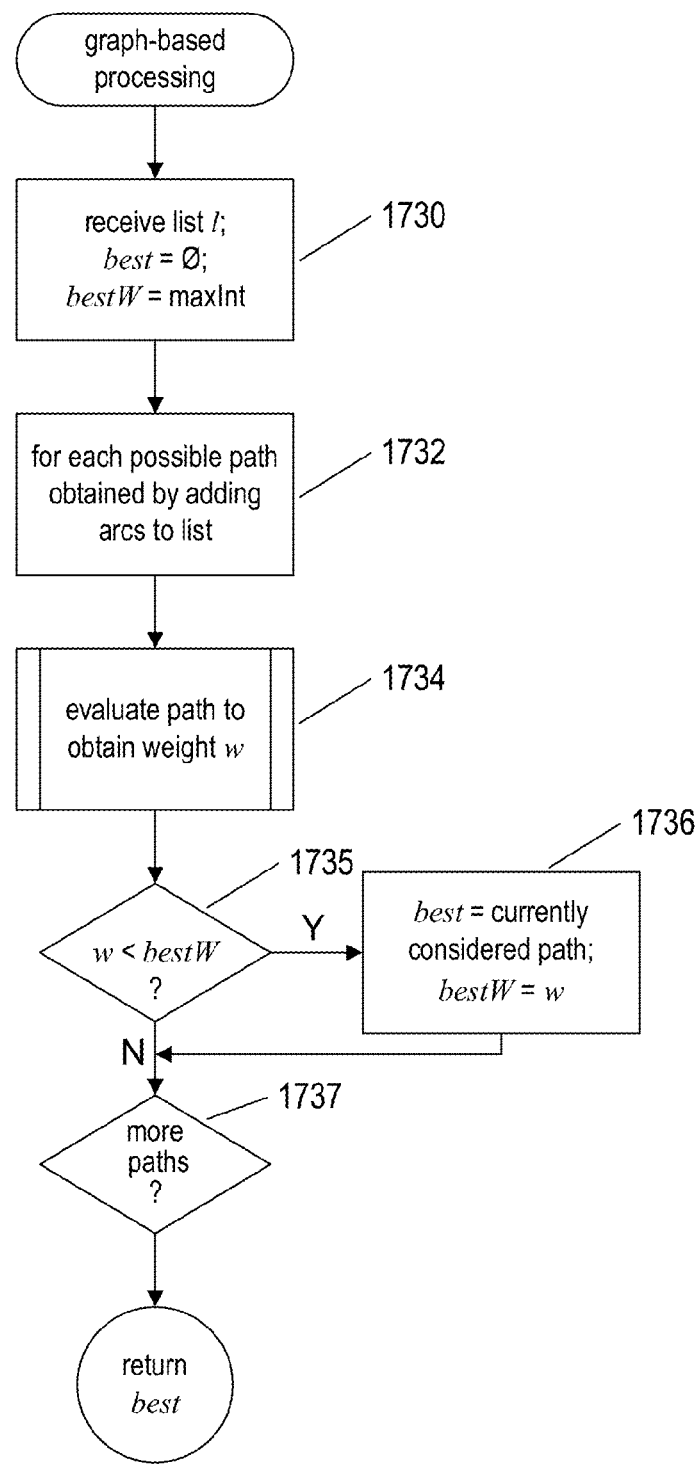
FIG. 17C provides control-flow diagrams that illustrate one implementation of the mathematical-expression-containing document-image processing to which the current document is directed.

FIGS. 17A-C provide control-flow diagrams that illustrate one implementation of the mathematical-expression-containing document-image processing to which the current document is directed. FIG. 17A provides a control-flow diagram for a routine "mathematical expression" that receives, as an argument, a document sub-image containing a mathematical expression and produces, as a result, a graph-like representation of the mathematical expression contained in the sub-image. In step 1702, the routine "mathematical expression" receives the sub-image containing the mathematical expression. The sub-image may be specified by a reference to a binary document image as well as indications of points within the binary document image that specify a containing rectangle or polygon for the sub-image containing the mathematical expression. In step 1704, the routine "mathematical expression" sets a local variable direction to "horizontal" and sets a local variable list to null. In step 1706, the routine "mathematical expression" calls a routine "recursively block" to recursively carry out blocking of the received sub-image, as discussed above with reference to FIGS. 16A-B. The routine "recursively block" also transforms lists of sub-images containing symbols into graph-like representations of sub-expressions within the mathematical expression and returns a final graph-like representation of the entire mathematical expression. In step 1708, the graph-like representation of the mathematical expression returned by the routine "recursively block" is used to generate an encoded mathematical expression corresponding to the mathematical expression contained in the received sub-image.

FIG. 17B provides a control-flow diagram for the routine "recursively block," called in step 1706 in FIG. 17A. In step 1710, the routine "recursively block" receives a sub-image s, a direction d, and a reference to a list l. In step 1712, the routine "recursively block" sets a local variable localL to null. In step 1714, the routine "recursively block" calls the routine "blocking," described above with reference to FIG. 15F, in order to carry out blocking of the sub-image in the direction indicated by the received argument d. As discussed above, d can indicate either horizontal or vertical blocking. Then, in the for-loop of steps 1716-1722, each block produced by the routine "blocking" is considered. In step 1717, the currently considered block b is subject to OCR symbol recognition. When the OCR symbol recognition successfully recognizes a symbol in the block b, as determined in step 1718, then, in step 1720, the routine "recursively block" creates a single-element list that includes a single element that represents the recognized symbol. Otherwise, in step 1719, the routine "recursively block" recursively calls itself in order to carry out a next level of blocking in a blocking direction opposite to the blocking direction received as argument d, indicated in FIG. 17B by the notation ]d. In other words, when argument d has the value "horizontal," then ]d has the opposite value "vertical," and when argument d has the value "vertical," then ]d has the opposite value "horizontal." The list produced in either of step 1720 or 1719 is added, in step 1721, to the list referenced by local variable localL. Once all of the blocks produced by the call to the routine "blocking," in step 1714, have been considered in the for-loops of steps 1716-1722, the routine "recursively block" calls a routine "graph-based processing," in step 1724, to carry out graph-based processing on the list referenced by local variable localL. Finally, in step 1726, the list referenced by the local variable localL is added to the list referenced by argument l.

FIG. 17C provides a control-flow diagram for the routine "graph-based processing," called in step 1724 of FIG. 17B. In step 1730, the routine "graph-based processing" receives a list l of elements, each representing a symbol recognized during recursive blocking, sets a local variable best to null, and sets a local variable bestW to a large number. Then, in the for-loop of steps 1732-1737, the routine "graph-based processing" considers possible paths obtained by adding arcs to the list of elements referenced by the local variable l. Linear-division graphs were previously discussed, in the context of symbol recognition, with reference to FIGS. 13A-B. The graph-based processing used in the routine "graph-based processing" may be similar to the previously discussed linear-division-graph based symbol recognition methods and are discussed below along with data structures that can be used to represent lists and paths in certain implementations. In step 1734, the currently considered path is evaluated to obtain a weight w for the graph. When w is less than bestW, as determined in step 1735, then, in step 1736, best is set to the currently considered path and the local variable bestW is set to w. The routine "graph-based processing" returns the best, or lowest-weight, path constructed with respect to the received list. Not all possible paths need be considered in the for-loop of steps 1732-1737. Various heuristics can be applied to select the most likely candidate paths for consideration. Moreover, during evaluation of a candidate path, in step 1734, evaluation can be short-circuited as soon as the cumulative weight reaches the current value stored in local variable bestW.

Figure 18A:
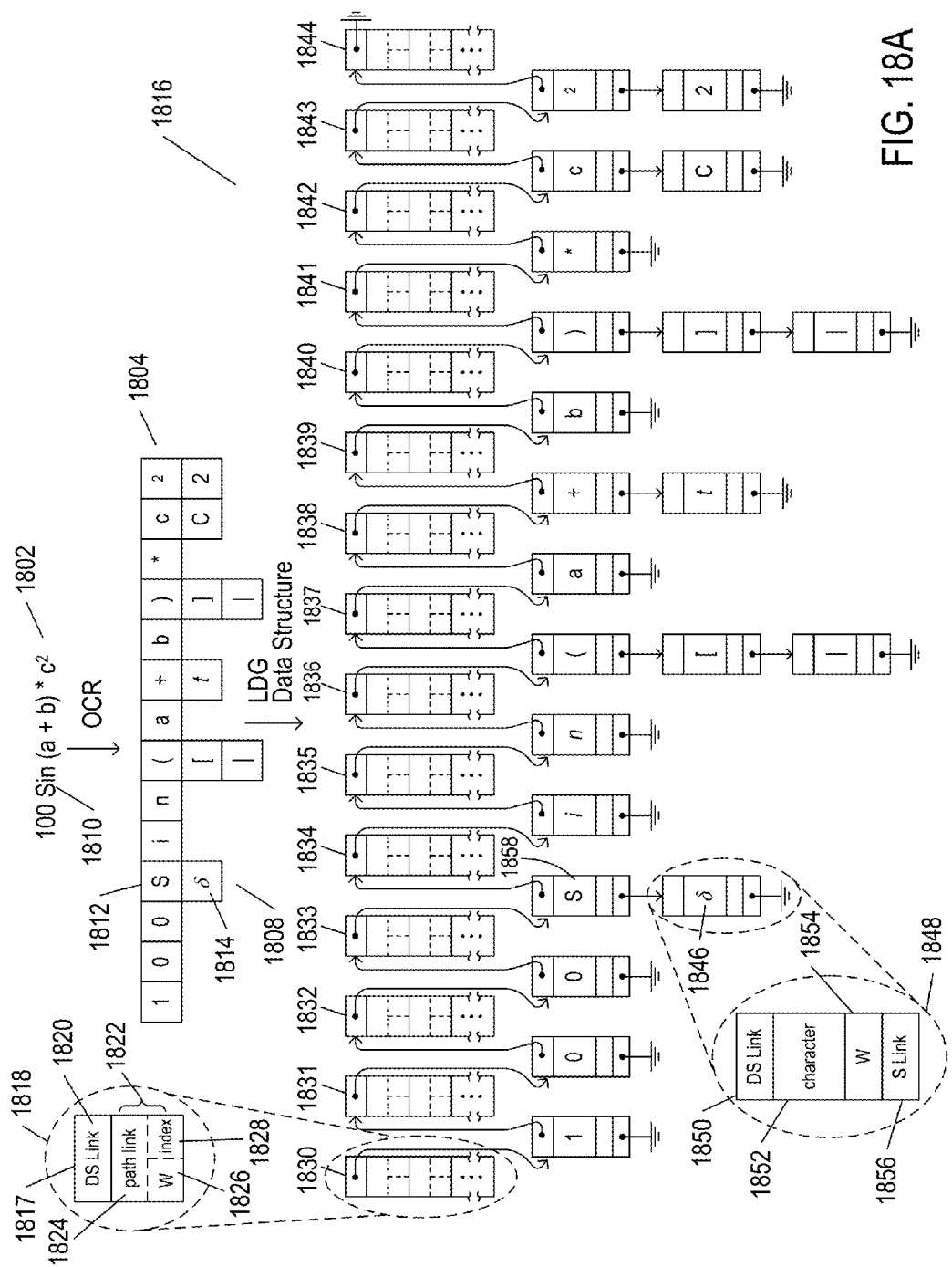
FIG. 18A illustrates application of graph-based processing to recognition of mathematical sub-expressions and entire mathematical expressions.
Figure 18B:
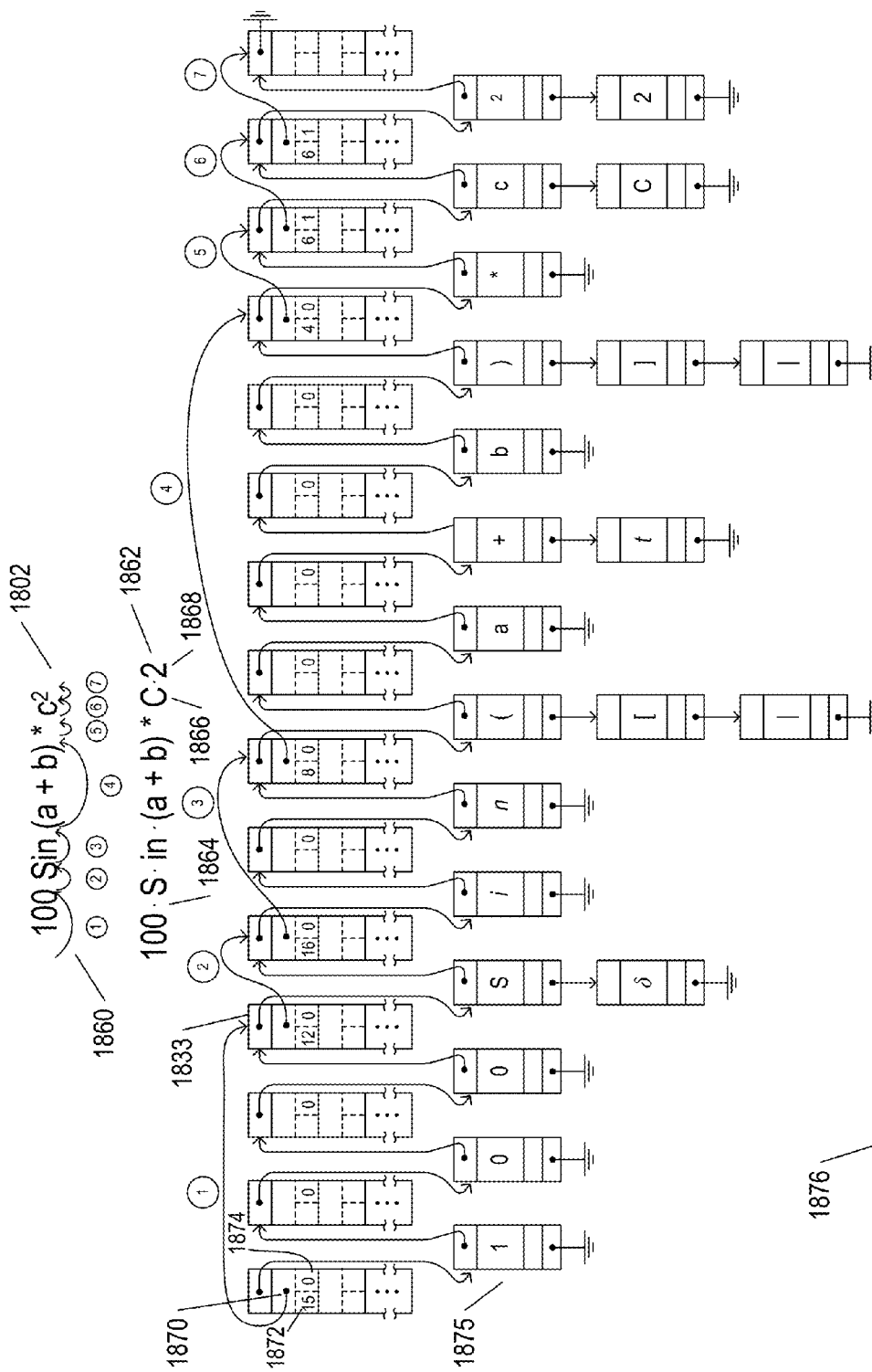
FIG. 18B illustrates application of graph-based processing to recognition of mathematical sub-expressions and entire mathematical expressions.
Figure 18C:
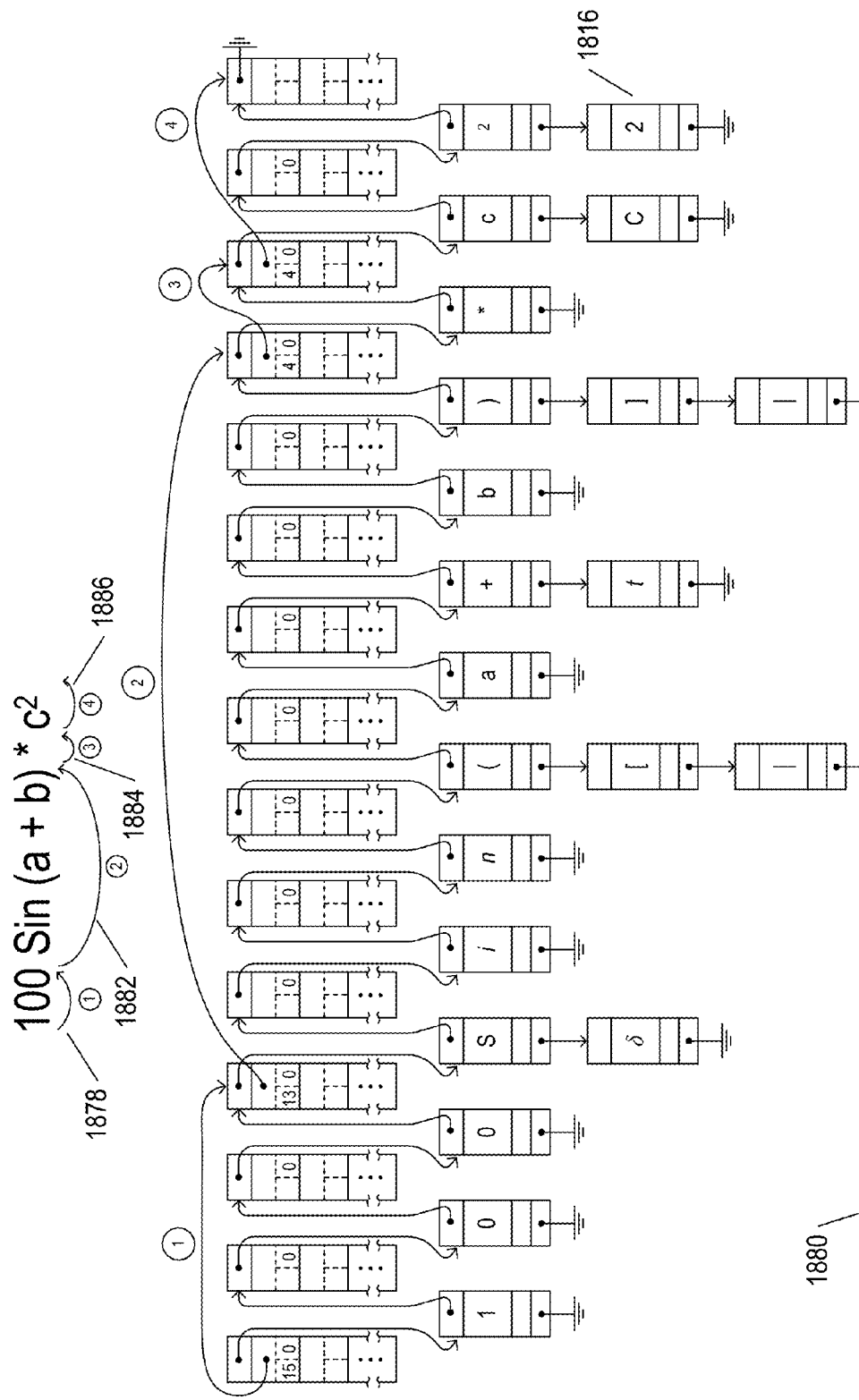
FIG. 18C illustrates application of graph-based processing to recognition of mathematical sub-expressions and entire mathematical expressions.

FIGS. 18A-C illustrate application of graph-based processing to recognition of mathematical sub-expressions and entire mathematical expressions. In FIG. 18A, an image of simple mathematical expression 1802 is shown. This expression may be a sub-expression within a larger mathematical expression. Horizontal blocking produces a set of grapheme possibilities, application of OCR to which produces a set of possible symbols 1804 shown within a multi-row data structure. The symbols shown in the first row of the data structure represent the symbols that OCR methods consider most likely to be contained in the image of the mathematical expression 1802. In certain cases, rather than a single symbol, a column of possible symbol variants, such as column 1808, are produced by application of OCR methods. In the case of column 1808, for example, application of OCR methods determines that the symbol 1810 in the expression image 1802 may be either a capital "S" 1812 or a Greek "δ" 1814. The set of recognized symbols 1804 is then transformed into an graph-like data structure 1816. The graph-like data structure includes two types of primitive data structures that are linked together to provide a data-structure basis for representing one or more paths.

In FIG. 18A, the first type of primitive data structure 1817 in the graph-like data structure is illustrated in inset 1818. This first type of primitive data structure 1817 includes a data-structure link or DS Link 1820 which links the primitive data structure to a next, second type of primitive data structure within the graph-like data structure. The first type of primitive data structure 1817 additionally includes multiple path substructures, such as path substructure 1822. Each path substructure includes a path link 1824, an arc weight 1826, and a symbol-variant index 1828. When not zero, the value stored in the path link 1824 is a reference to another of the first type of primitive data structures and represents an arc within a path of the graph-like data structure. The arc weight 1826 is a weight that is assigned to the arc represented by the contents of the path link 1824. The arc weight provides an indication of the likelihood that the arc represents a valid symbol-grouping hypothesis for the mathematical expression. In the currently described implementation, the lower the weight, the more likely the hypothesis. Of course, other conventions may be used in alternative implementations. The symbol-variant index 1828 indicates which of the symbol variants in a column of symbol variants, such as column 1808, discussed above, occur in a particular path. A symbol-variant index with value "0," for example, indicates that the first-row symbol variant for the symbol represented by one or more second-type primitive data structures, as discussed below, occurs in the path. In the graph-like data structure 1816 shown in FIG. 18A, all of the top primitive data structures 1830-1844 are of the first type of primitive data structure illustrated inset 1818. These represent possible nodes and arcs of one or more paths constructed for the set of symbols.

The second type of primitive data structure is used to represent symbol variants. For example, primitive data structure 1846 represents the symbol variant δ 1814. This second type of primitive data structure is illustrated in inset 1848. The second type of primitive data structure also includes a DS Link 1850, a representation of the character or symbol 1852, an OCR weight 1854 that indicates the likelihood that the symbol variant is, in fact, representative of the corresponding symbol in the mathematical expression or sub-expression, and a symbol-data-structure link, or S link, 1856 that allows the second type of primitive data structures to be linked together to form columns, such as the linked data structures 1858 and 1846 that together form column 1808 in the above-illustrated set of symbol variants 1804. In addition, many other values may be stored in the second type of primitive data structure, including the level of recursive blocking at which the symbol was recognized, position, font type, and font size information for the symbol, and other such information that may be made available during application of OCR methods.

FIG. 18B illustrates a first possible path corresponding to the expression or sub-expression image 1802 shown in FIG. 18A. The path is indicated by curved arrows, such as curved arrow 1860 in the expression at the top of FIG. 18B 1802. Each arc is labeled with a circled integer. Each arc represents a group of one or more symbol variants that together represent a meaningful grouping of symbols within the mathematical expression. For example, a first arc 1860 indicates that the symbols "1," "0," and "0" together represent the integer 100. The lower expression 1862 in FIG. 18B indicates a mathematical interpretation of the path shown in FIG. 18B. The dots, such as dot 1864, are introduced to indicate implied multiplication. Note that, in the path shown in FIG. 18B, the second symbol variants for symbols 1866 and 1868 have been selected for the path. In FIG. 18B, values have been added to path substructures within the first type of primitive data structures to represent the path illustrated by arcs added to expression 1802. For example, arc 1860 is represented by a reference stored in path link 1870 to primitive data structure 1833. The weight of this arc, 15 (1872 in FIG. 18B) is stored in the weight field of the path-link substructure. An index of 0 (1874 in FIG. 18B) indicates that the first symbol variant in the linked list of second-type primitive data structures referenced by the DS Link is used in the path. As shown by expression 1876 at the bottom of FIG. 18B, the path weight is computed as the sum of the arc weights for the arcs of the path and, in the path illustrated in FIG. 18B, has a numerical value of 67.

FIG. 18C illustrates a second possible path for the expression 1802 in FIG. 18A. This path has four arcs, illustrated by curved arrows, such as curved arrow 1878. The same illustration conventions are used in FIG. 18C as used in FIG. 18B. Values have been assigned to fields within path substructures of the first-type primitive data structures of the graph-like data structure 1816 to represent this second path. The weight of the second path is shown by expression 1880 at the bottom of FIG. 18C, and has the value 36. Note that this second path may be viewed as the correct groupings for the symbols for the mathematical expression 1802 in FIG. 18A. The first arc 1878 indicates a grouping of symbols that represent the integer 100, a second arc 1882 represents the collection of symbols "Sin(a+b)," which is the transcendental sine function applied to the sum a+b, the third arc 1884 is the multiplication symbol, and the fourth arc 1886 represents the grouping of symbols "$c^2$".

Figure 19:
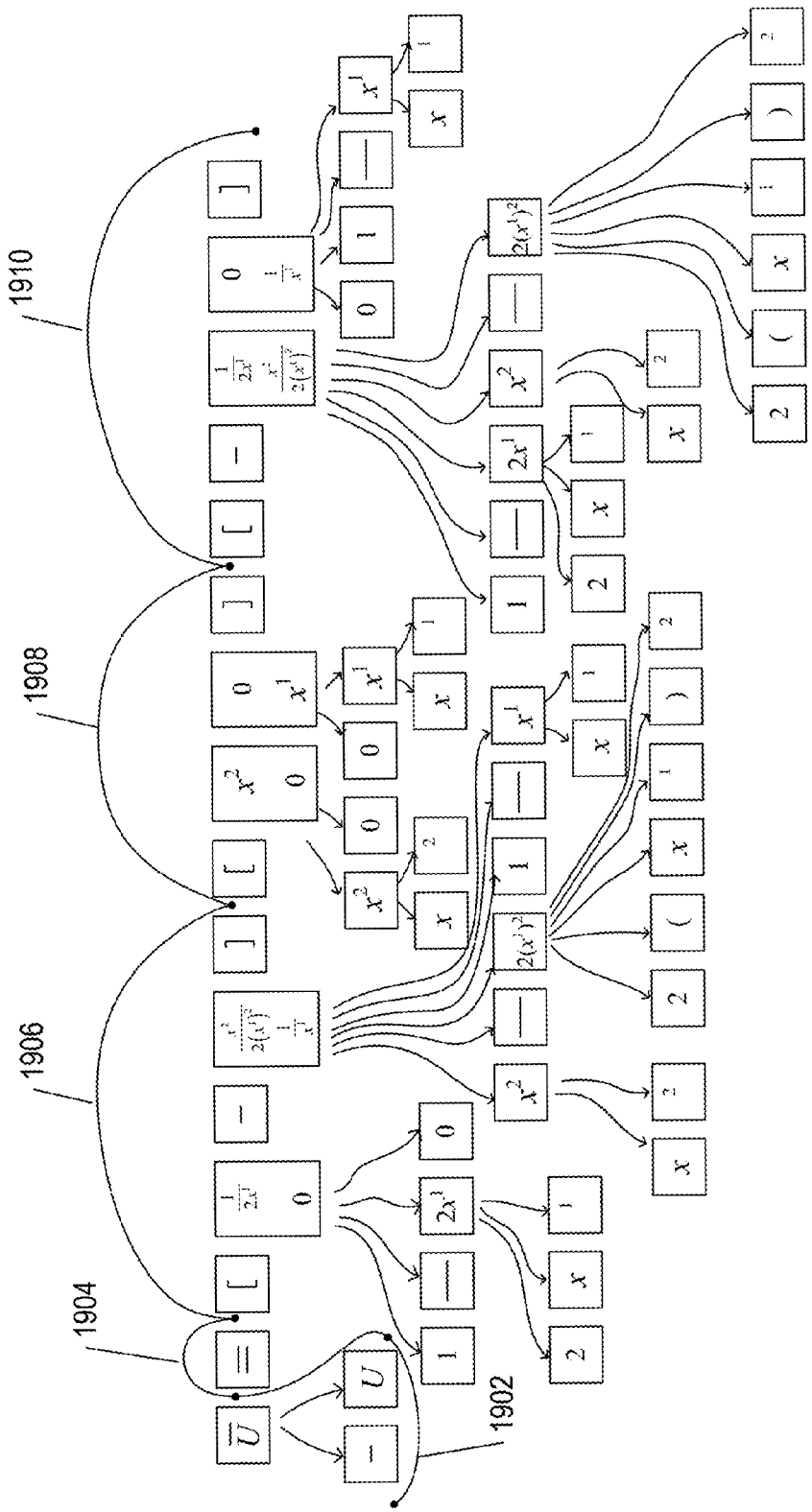
FIG. 19 shows the tree-like results produced by recursive blocking initially shown in FIG. 16B with arcs of a correct path for the mathematical expression 1406 of FIG. 14A.

FIG. 19 shows the tree-like results produced by recursive blocking initially shown in FIG. 16B with arcs of a correct path for the mathematical expression 1406 of FIG. 14A. The correct path includes a first arc 1902 for $\overline{U}$, a second arc 1904 for the equal sign, a third arc 1906 for the first matrix, a fourth arc 1908 for the second matrix, and a fifth arc 1910 for the third matrix.

A large number of possible paths can be constructed from a given expression. However, as discussed above, many types of heuristics and construction methods may be employed to generate only a relatively small number of candidate paths for a sequence of recognized symbols. For example, a sequence of decimal digits, such as "100," are likely to represent a single integer, rather than separate decimal digits. As another example, the symbol sequence "Sin" can be recognized as the common abbreviation for the transcendental function sine by locating "Sin" in a dictionary of well-known mathematical functions. Many symbols may occur in pairs, with intervening sub-expressions, including parentheses and brackets. Paths in which these symbol pairs are grouped together by a single arc may be assigned favorable weights, because they are likely to indicate embedded sub-expressions. Many of the paths for sub-expressions generated during recursive blocking may be straightforwardly mapped to mathematical-expression parse trees, and such mappings may provide the basis for powerful heuristics for selecting reasonable candidate paths. Font size and symbol position often indicate subscripts and superscripts, and provide additional valuable heuristics for recognizing superscripts and subscripts in mathematical expressions. Similar heuristics can be used to recognize the limits of definite integrals and summation limits. The level of blocking recursion at which a symbol is recognized may also provide a good indication of the logical level of a sub-expression within a mathematical expression. The weights associated with arcs are computed based on heuristics used to generate the arcs as well as on weights associated with symbol variants spanned by the arcs.

Although the present invention has been described in terms of particular embodiments, it is not intended that the invention be limited to these embodiments. Modifications within the spirit of the invention will be apparent to those skilled in the art. For example, any of a variety of different implementations of the method for processing images and sub-images of mathematical expressions to which the current document is directed can be obtained by varying any of many different design and implementation parameters, including programming language, hardware platform, operating system, control structures, modular organization, data structures, and other such parameters. Different implementations may use different types of recursive decomposition that produce different types of subtree structures for various groupings of mathematical symbols. Many different types of node data structures and tree encodings can be used. In certain implementations, rather than constructing a hierarchical tree, the information relevant for hypothesis generation may be passed as parameters to recursive calls and therefore end up being temporarily stored in the stack rather than in a tree-like data structure. Any of a variety of different electronic-encoding subsystems may be used to encode a mathematical expression from the symbol decomposition of the image or sub-image containing a representation of the mathematical expression.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A system comprising:
one or more electronic memories that store instructions for automated optical symbol recognition; and
one or more processors to execute the instructions to:
apply blocking to an image stored in at least one of the memories to decompose the image into an ordered set of symbol variants, wherein the image depicts a mathematical expression, and wherein, to apply blocking to the image, the processors are further to execute the instructions to:
set a blocking-direction indication to indicate one of a horizontal blocking-direction or a vertical blocking-direction;
set a current-level indication to indicate a first level;
block the image into sub-images at a level according to the current-level indication and in a direction according to the blocking-direction indication; and
recursively for each sub-image in the sub-images at the level, apply one or more symbol-recognition methods to the sub-image;
select a most probable path from among candidate paths corresponding to the ordered set of symbol variants;
use the most probable path and the ordered set of symbol variants to generate an encoded mathematical expression equivalent to the mathematical expression; and
store the encoded mathematical expression in one or more of the memories.

2. The system of claim 1, wherein, to apply blocking to the image, the processors are further to execute the instructions to:
recursively for each sub-image in the sub-images at the level, in response to a failure of the application of the symbol-recognition methods to identify the sub-image as a single-symbol-containing sub-image, set the blocking-direction indication to the other of the horizontal blocking direction or the vertical blocking direction, advance the current-level indication to a next level, and recursively apply blocking to the sub-image using the blocking-direction indication and the current-level indication.

3. The system of claim 1, wherein the candidate paths corresponding to the ordered set of symbol variants each comprise one or more arcs, and wherein each of the arcs encompasses an ordered subset of the ordered set of symbol variants.

4. The system of claim 3, wherein each of the arcs is associated with an arc weight, and wherein the most probable path is selected based on the arc weight of one or more of the arcs.

5. The system of claim 4, wherein a path weight is computed for each candidate path among the candidate paths as a sum of the arc weight associated with each of the arcs of the candidate path, and wherein the most probable path is selected based on the path weight of one or more of the candidate paths.

6. The system of claim 5, wherein a probability of the candidate path being the most probable path is inversely related to the path weight of the candidate path, and wherein, to select the most probable path, the processors are further to execute the instructions to select the candidate path having the path weight that is lowest as the most probable path.

7. The recognition system of claim 5, wherein a probability of the candidate path being the most probable path is directly related to the path weight of the candidate path, and wherein, to select the most probable path from among the candidate paths corresponding to the ordered set of symbol variants, the processors are further to execute the instructions to select the candidate path having the path weight that is highest as the most probable path.

8. The system of claim 1, wherein, to apply blocking to the image, the processor are further to execute the instructions to:
identify white-space stripes with directions equal to, or within a threshold angular displacement from, a direction orthogonal to a blocking direction;
coalesce overlapping ones of the white-space stripes to produce non-overlapping white-space stripes; and
use the non-overlapping white-space stripes as block borders to partition the image into two or more blocks along the blocking direction.

9. The system of claim 8, wherein the white-space stripes comprise a stripe with parallel sides, wherein the sides have directions equal to an angle of intersection with the blocking direction, and wherein the stripe spans the image that contains less than a threshold number of pixels, or less than a threshold area, corresponding to symbols within the image.

10. The system of claim 8, wherein, to coalesce the overlapping ones of the white-space stripes, the processors are further to execute the instructions to:
identify one or more groups of two or more of the white-space stripes that are mutually intersecting or that are each separated from another one of the white-space stripes in the group by less than a threshold distance;
coalesce intersecting ones of the white-space stripes of each group among the groups that have a same direction; and
select a white-space stripe from each group among the groups that has a direction equal to a direction of one or more of the whites-pace stripes with a greatest total area in the group.

11. A method comprising:
applying, by one or more processors that execute instructions stored in one or more memories for automated optical symbol recognition, blocking to an image stored in at least one of the memories to decompose the image into an ordered set of symbol variants, wherein the image depicts a mathematical expression;
selecting, by the processors, a most probable path from among candidate paths corresponding to the ordered set of symbol variants, wherein the candidate paths corresponding to the ordered set of symbol variants each comprise one or more arcs, wherein each of the arcs encompasses an ordered subset of the ordered set of symbol variants, wherein each of the arcs is associated with an arc weight, and wherein the most probable path is selected based on the arc weight of one or more of the arcs;
using the most probable path and the ordered set of symbol variants to generate an encoded mathematical expression equivalent to the mathematical expression; and
storing the encoded mathematical expression in one or more of the memories.

12. The method of claim 11, wherein applying blocking to the image further comprises:
    setting a blocking-direction indication to indicate one of a horizontal blocking direction or a vertical blocking-direction;
    setting a current-level indication to indicate a first level;
    blocking the image into sub-images at a level according to the current-level indication and in a direction according to the blocking-direction indication; and
    recursively for each sub-image in the sub-images at the current level:
        applying one or more symbol-recognition methods to the sub-image; and
        in response to a failure of the application of the symbol-recognition methods to identify the sub-image as a single-symbol-containing sub-image, setting the blocking-direction indication to the other of the horizontal-blocking direction or the vertical-blocking direction, advancing the current-level indication, and recursively applying blocking to the sub-image using the blocking-direction indication and the current-level indication.

13. The method of claim 11, wherein a path weight is computed for each candidate path among the candidate paths as a sum of the arc weight associated with each of the arcs of the candidate path.

14. The method of claim 13, wherein a probability of the candidate path being the most probable path is inversely related to the path weight of the candidate path, and wherein selecting the most probable path further comprises selecting the candidate path having the path weight that is lowest as the most probable path.

15. The method of claim 13, wherein a probability of the candidate path being the most probable path is directly related to the path weight of the candidate path, and wherein selecting the most probable path further comprises selecting the candidate path having the path weight that is highest as the most probable path.

16. The method of claim 11, wherein applying blocking to the image further comprises:
    identifying white-space stripes with directions equal to, or within a threshold angular displacement from, a direction orthogonal to a blocking direction;
    coalescing overlapping ones of the white-space stripes to produce non-overlapping white-space stripes; and
    using the non-overlapping white-space stripes as block borders to partition the image into two or more blocks along the blocking direction.

17. The method of claim 16, wherein the white-space stripes comprise a stripe with parallel sides, wherein the sides have directions equal to an angle of intersection with the blocking direction, and wherein the stripe spans the image that contains less than a threshold number of pixels, or less than a threshold area, corresponding to symbols within the image.

18. The method of claim 16, wherein coalescing the overlapping ones of the white-space stripes further comprises:
    identifying one or more groups of two or more of the white-space stripes that are mutually intersecting or that are each separated from another one of the white-space stripes in the group by less than a threshold distance;
    coalescing intersecting ones of the white-space stripes of each group among the groups that have a same direction; and
    selecting a white-space stripe from each group among the groups that has a direction equal to a direction of one or more of the whites-pace stripes with a greatest total area in the group.

19. Computer A non-transitory computer-readable storage medium having stored therein instructions that, when executed by one or more processors, cause the processors to:
    apply, by the processors that execute the instructions for automated optical symbol recognition, blocking to an image stored in at least one of one or more memories to decompose the image into an ordered set of symbol variants, wherein the image depicts a mathematical expression;
    select, by the processors, a most probable path from among candidate paths corresponding to the ordered set of symbol variants, wherein the candidate paths corresponding to the ordered set of symbol variants each comprise one or more arcs, wherein each of the arcs encompasses an ordered subset of the ordered set of symbol variants, wherein each of the arcs is associated with an arc weight, and wherein the most probable path is selected based on the arc weight of one or more of the arcs;
    use the most probable path and the ordered set of symbol variants to generate an encoded mathematical expression equivalent to the mathematical expression; and
    store the encoded mathematical expression in one or more of the memories.

* * * * *